United States Patent
Nemcek et al.

(10) Patent No.: US 10,030,878 B2
(45) Date of Patent: Jul. 24, 2018

(54) USER INTERACTION WITH BUILDING CONTROLLER DEVICE USING A REMOTE SERVER AND A DUPLEX CONNECTION

(71) Applicant: Honeywell International Inc., Morristown, NJ (US)

(72) Inventors: Adam Nemcek, Ostrava (CZ); Tomas Hrebicek, Rousinov (CZ); Daniel Becvar, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 344 days.

(21) Appl. No.: 14/737,076

(22) Filed: Jun. 11, 2015

(65) Prior Publication Data

US 2015/0276254 A1     Oct. 1, 2015

Related U.S. Application Data

(63) Continuation-in-part of application No. 14/463,708, filed on Aug. 20, 2014.
(Continued)

(51) Int. Cl.
*G05D 23/12* (2006.01)
*G05D 23/185* (2006.01)
(Continued)

(52) U.S. Cl.
CPC ........ *F24F 11/006* (2013.01); *F24D 19/1084* (2013.01); *F24F 11/30* (2018.01);
(Continued)

(58) Field of Classification Search
CPC ............. F24F 11/006; F24F 2011/0053; F24F 2011/0071; G10L 15/30; G05D 23/1905
See application file for complete search history.

(56) References Cited

U.S. PATENT DOCUMENTS

| | | |
|---|---|---|
| 4,223,831 A | 9/1980 | Szarka |
| 4,253,153 A | 2/1981 | Bitterli et al. |

(Continued)

FOREIGN PATENT DOCUMENTS

| | | |
|---|---|---|
| CN | 201225714 | 4/2009 |
| CN | 101947788 | 1/2011 |

(Continued)

OTHER PUBLICATIONS

Action Talking Products LLC, "Kelvin Installation Manual," V1.5, pp. 1-15, downloaded Jul. 14, 2015.
(Continued)

*Primary Examiner* — Larry Furdge
(74) *Attorney, Agent, or Firm* — Seager Tufte & Wickhem LLP

(57) ABSTRACT

An HVAC controller may be controlled in response to a natural language audio message that is not recognizable by the HVAC controller as a command, where the natural language audio message is translated into a command recognizable by the HVAC controller. Voice recognition software identifies a trigger phrase included in the natural language audio message and in response the HVAC controller performs an action. In response to identifying a trigger phrase at the HVAC controller, the HVAC controller may establish a single duplex connection with a remote server having a voice interaction module. An end user may then have a continuous dialog with the voice interaction module via the HVAC controller over the established single duplex connection. The voice interaction module may allow for an end user to interrupt the dialog at any time, as desired.

17 Claims, 12 Drawing Sheets

Related U.S. Application Data

(60) Provisional application No. 61/868,441, filed on Aug. 21, 2013.

(51) Int. Cl.

| | | |
|---|---|---|
| *F24F 11/00* | (2018.01) | |
| *G05B 15/02* | (2006.01) | |
| *H04L 12/28* | (2006.01) | |
| *F24D 19/10* | (2006.01) | |
| *G10L 15/22* | (2006.01) | |
| *G05D 23/19* | (2006.01) | |
| *G10L 15/30* | (2013.01) | |
| *F24F 11/30* | (2018.01) | |
| *F24F 11/62* | (2018.01) | |
| *G10L 15/08* | (2006.01) | |
| *F24F 110/00* | (2018.01) | |
| *F24F 130/40* | (2018.01) | |
| *F24F 11/56* | (2018.01) | |
| *F24F 11/58* | (2018.01) | |
| *F24F 11/52* | (2018.01) | |

(52) U.S. Cl.
CPC .............. *F24F 11/62* (2018.01); *G05B 15/02* (2013.01); *G05D 23/1905* (2013.01); *G10L 15/22* (2013.01); *G10L 15/30* (2013.01); *H04L 12/2816* (2013.01); *F24F 11/52* (2018.01); *F24F 11/56* (2018.01); *F24F 11/58* (2018.01); *F24F 2110/00* (2018.01); *F24F 2130/40* (2018.01); *G10L 2015/088* (2013.01)

(56) References Cited

U.S. PATENT DOCUMENTS

| | | |
|---|---|---|
| 4,340,797 A | 7/1982 | Takano et al. |
| 4,353,502 A | 10/1982 | Myers |
| 4,381,549 A | 4/1983 | Stamp, Jr. et al. |
| 4,598,397 A * | 7/1986 | Nelson .................. H04L 12/42 370/468 |
| 4,790,143 A | 12/1988 | Hanson |
| 5,065,813 A | 11/1991 | Berkeley et al. |
| 5,086,385 A * | 2/1992 | Launey ............... G06F 3/04847 340/6.11 |
| 5,123,252 A | 6/1992 | Hanson |
| 5,161,606 A | 11/1992 | Berkeley et al. |
| 5,284,024 A | 2/1994 | Hanson et al. |
| 5,345,226 A | 9/1994 | Rice, Jr. et al. |
| 5,395,042 A | 3/1995 | Riley et al. |
| 5,422,824 A | 6/1995 | Biehler et al. |
| 5,596,507 A | 1/1997 | Jones et al. |
| 5,682,329 A | 10/1997 | Seem et al. |
| 5,690,277 A | 11/1997 | Flood |
| 5,794,205 A | 8/1998 | Walters et al. |
| 6,083,270 A | 7/2000 | Scott |
| 6,385,510 B1 | 5/2002 | Hoog et al. |
| 6,413,079 B1 | 7/2002 | Lyons et al. |
| 6,526,335 B1 | 2/2003 | Treyz et al. |
| 6,584,439 B1 | 6/2003 | Geilhufe et al. |
| 6,813,221 B1 | 11/2004 | Barr |
| 6,988,070 B2 | 1/2006 | Kawasaki et al. |
| 7,108,194 B1 | 9/2006 | Hankins, II |
| 7,139,716 B1 | 11/2006 | Gaziz |
| 7,146,253 B2 | 12/2006 | Hoog et al. |
| 7,184,960 B2 | 2/2007 | Deisher et al. |
| 7,280,643 B2 | 10/2007 | Howard et al. |
| 7,349,758 B2 | 3/2008 | Miro et al. |
| 7,397,363 B2 | 7/2008 | Joao |
| 7,436,292 B2 | 10/2008 | Rourke et al. |
| 7,436,296 B2 | 10/2008 | Rourke et al. |
| 7,451,937 B2 | 11/2008 | Flood et al. |
| 7,454,269 B1 | 11/2008 | Dushane et al. |
| 7,464,035 B2 | 12/2008 | Funk et al. |
| 7,522,063 B2 | 4/2009 | Ehlers |
| 7,720,683 B1 | 5/2010 | Vermeulen et al. |
| 7,747,446 B2 | 6/2010 | Blass et al. |
| 7,752,047 B2 | 7/2010 | Morris |
| 7,890,334 B2 | 2/2011 | Park et al. |
| 7,899,912 B2 | 3/2011 | Bisdikian et al. |
| 7,957,974 B2 | 6/2011 | Cho et al. |
| 8,013,730 B2 | 9/2011 | Oh et al. |
| 8,019,567 B2 | 9/2011 | Steinberg et al. |
| 8,042,048 B2 | 10/2011 | Wilson et al. |
| 8,068,881 B2 | 11/2011 | Schrager |
| 8,078,472 B2 | 12/2011 | Resch et al. |
| 8,099,289 B2 | 1/2012 | Mozer et al. |
| 8,107,989 B2 | 1/2012 | Budampati et al. |
| 8,155,767 B2 | 4/2012 | ElMankabady et al. |
| 8,175,884 B1 | 5/2012 | Morris |
| 8,234,119 B2 | 7/2012 | Dhawan et al. |
| 8,239,922 B2 | 8/2012 | Sullivan et al. |
| 8,411,590 B2 | 4/2013 | Wang |
| 8,509,954 B2 | 8/2013 | Imes et al. |
| 8,630,742 B1 | 1/2014 | Stefanski et al. |
| 2002/0034956 A1 | 3/2002 | Mekuria |
| 2002/0193989 A1 | 12/2002 | Geilhufe et al. |
| 2003/0034898 A1 | 2/2003 | Shamoon et al. |
| 2003/0036909 A1 | 2/2003 | Kato |
| 2003/0088642 A1 | 5/2003 | Price et al. |
| 2003/0177012 A1 | 9/2003 | Drennan |
| 2003/0233432 A1 | 12/2003 | Davis et al. |
| 2004/0019489 A1 | 1/2004 | Funk et al. |
| 2006/0161270 A1 | 7/2006 | Luskin et al. |
| 2006/0180676 A1 | 8/2006 | Park et al. |
| 2007/0135969 A1 | 6/2007 | Curl |
| 2007/0192486 A1 | 8/2007 | Wilson et al. |
| 2007/0204228 A1 | 8/2007 | Mincar |
| 2007/0263600 A1 | 11/2007 | Sutardja et al. |
| 2007/0286181 A1 | 12/2007 | Bushmitch et al. |
| 2008/0037727 A1 | 2/2008 | Sivertsen et al. |
| 2008/0091432 A1 | 4/2008 | Dalton et al. |
| 2008/0175261 A1 | 7/2008 | Wang |
| 2008/0221714 A1 | 9/2008 | Schoettle |
| 2008/0233983 A1 | 9/2008 | Park et al. |
| 2009/0059786 A1 | 3/2009 | Budampati et al. |
| 2009/0064295 A1 | 3/2009 | Budampati et al. |
| 2009/0086940 A1 | 4/2009 | Diethorn et al. |
| 2009/0134993 A1* | 5/2009 | Ashworth ............. F24F 11/0012 340/501 |
| 2009/0143918 A1 | 6/2009 | Amundson et al. |
| 2009/0204262 A1 | 8/2009 | Nishimura |
| 2009/0204410 A1* | 8/2009 | Mozer .................... G10L 15/30 704/275 |
| 2009/0323904 A1 | 12/2009 | Shapiro et al. |
| 2010/0223055 A1 | 9/2010 | McLean |
| 2010/0332235 A1 | 12/2010 | David |
| 2011/0046792 A1 | 2/2011 | Imes et al. |
| 2011/0140914 A1 | 6/2011 | Pelech et al. |
| 2011/0210816 A1 | 9/2011 | Wang |
| 2011/0257973 A1 | 10/2011 | Chutorash et al. |
| 2011/0290893 A1 | 12/2011 | Steinberg |
| 2012/0021684 A1 | 1/2012 | Schultz et al. |
| 2012/0066286 A1 | 3/2012 | Heredia et al. |
| 2012/0123561 A1 | 5/2012 | Park et al. |
| 2012/0136666 A1 | 5/2012 | Corpier et al. |
| 2012/0158161 A1* | 6/2012 | Cohn .................. H04L 12/2827 700/90 |
| 2013/0006400 A1 | 1/2013 | Caceres et al. |
| 2013/0117395 A1 | 5/2013 | Buschmitch et al. |
| 2013/0138250 A1 | 5/2013 | Mowery et al. |
| 2013/0183944 A1 | 7/2013 | Mozer et al. |
| 2013/0297078 A1 | 11/2013 | Kolavennu |
| 2014/0163751 A1 | 6/2014 | Davis et al. |
| 2014/0330435 A1 | 11/2014 | Stoner et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |

FOREIGN PATENT DOCUMENTS

| | | |
|---|---|---|
| CN | 202092667 | 12/2011 |
| CN | 102332204 | 1/2012 |
| CN | 102436273 | 5/2012 |

(56) References Cited

FOREIGN PATENT DOCUMENTS

| | | |
|---|---|---|
| EP | 1054387 | 11/2000 |
| EP | 1119191 | 7/2001 |
| EP | 1260886 | 11/2002 |
| EP | 1345360 | 7/2006 |
| EP | 1135757 | 11/2006 |
| EP | 1415218 | 2/2011 |
| EP | 2801972 A1 | 11/2014 |
| GB | 2094508 | 9/1982 |
| JP | 3803045 | 8/2006 |
| JP | 2006208460 | 8/2006 |
| JP | 2006317573 | 11/2006 |
| JP | 4503310 | 7/2010 |
| JP | 2010181064 | 8/2010 |
| JP | 4533844 | 9/2010 |
| JP | 2010236759 | 10/2010 |
| JP | 4640178 | 3/2011 |
| JP | 4839605 | 12/2011 |
| KR | 20100026353 | 3/2010 |
| KR | 20110012048 | 2/2011 |
| KR | 20110045314 | 5/2011 |
| KR | 20120017492 | 2/2012 |
| KR | 101151571 | 5/2012 |
| WO | WO 93/13507 | 7/1993 |
| WO | WO 99/34339 | 7/1999 |
| WO | WO 2006/126192 | 11/2006 |
| WO | WO 2007/101164 | 9/2007 |
| WO | WO 2008/018102 | 2/2008 |
| WO | WO 2009/107211 | 9/2009 |
| WO | WO 2009/147927 | 10/2009 |

OTHER PUBLICATIONS https://storify.com/plumbingtips969/a-thermostat-that-speaks-to-a-consumer-s-needs, "A Thermostat That Speaks to a Consumer's Needs," 3 pages, printed Jul. 14, 2015.
SmartWay Solutions, Inc., "Talking Thermostat Model VT3000, User's Guide," pp. 1-20, downloaded Jul. 14, 2015.
Systems Controls & Instruments, LLC, "CEM-24 Series Owner's Manual—Installation and Operating Instructions," 32 pages, downloaded Jul. 14, 2015.
"T² RERC Rehabilitation Engineering Research Center on Technology Transfer, Accessible Thermostat," 40 pages, downloaded Jun. 6, 2013.
Brown, et al., "Joint DoD/Industry Study on Opportunities in Integrated Diagnostics," Institute for Defense Analysis, 110 pages, Jan. 1990.
Carrier Comfort Network, "Carrier Comfort System VVT$_{III}$," 6 pages, Aug. 1996.
Carvalho et al., "Voice Thermostat Remote Control," Proceedings of the IEEE 25$^{th}$ Annual Northeast Bioengineering Conference, pp. 59-60, Apr. 8-9, 1999.
Coleman (a Johnson Controls Company), "Hints for Homeowner's, A Thermostat That Speaks to Consumer's Needs," 1 page, on or before Jul. 20, 2006.
International Search Report for PCT application serial No. pct/us2013/039326, dated Aug. 6, 2013.
Honeywell, "PM7006A Network Compatible Computer Room Air Conditioning (CRAC) Program Module for W7600 Control Module," 72 pages, Aug. 1993.
http://www.accendaproducts.com/kelvin/index.html, "Kelvin Voice Operated Thermostat," 2 pages, printed Dec. 9, 2013.
http://www.automatedliving.com, "Control Your Home by Voice or the Web, Anytime Anywhere," 4 pages, printed Dec. 9, 2013.
http://www.broadenedhorizons.com/voiceir/, VoiceIR Environmental Voice Controller Configurator—Broadened Horizons, 17 pages, Dec. 9, 2013.
http://www.innotechsystems.com/voice.htm, "Voice Recognition & Voice Interactive Products," 1 page, printed Dec. 9, 2013.
http://www.rciautomation.com/thermostat_phone.htm, "Telephone Controlled Thermostat," 4 pages, printed Dec. 9, 2013.
http://www.talkingthermostats.com/blind.shtml, "Talking Thermostats for Persons who are blind," 3 pages, printed Dec. 12, 2013.
https://github.com/chilitechno/SiriProxy-NestLearningthetmostat, "Siri Proxy-NestLearning Thermostat," 3 pages, printed Jan. 6, 2014.
https://github.com/plamoni/SiriProxy, "SiriProxy," 7 pages, printed Dec. 9, 2013.
Jacobson, "Design: A Voice Activated Thermostat," Biomedical Sciences Instrumentation, Technical Papers Composing the Proceedings of the 29$^{th}$ Annual Rocky Mountain Bioengineering Symposium & 29$^{th}$ International ISA Biomedical Sciences Instrumentation Symposium, vol. 28, pp. 15-19, 1992.
Lacquet et al., "Short Communications, An Affordable Digital-Display-to-Natural-Voice Converter for Visually Impaired Radio Amateurs," IEEE Transactions on Rehabilitation Engineering, vol. 4, No. No. 4, 6 pages, Dec. 1996.
Lee et al., "Fault Detection in an Air-Handling Unit Using Residual and Recursive Parameter Identification Methods," ASHRAE Transactions vol. 102, Pt. 1, pp. 1-22, 1996.
Lopez et al., "Temperature and Humidity Laboratory Remote Controller," Journal of the Mexican Society of Instrumentation, pp. 14-20, 1996.
Miles et al., "An Audible Thermostat for the Blind or Visually Challenged," Proceedings of the IEEE 23$^{rd}$ Northeast Bioengineering Conference, pp. 68-69, May 21-22, 1997.
Piette et al., "Model-Based Chiller Energy Tracking for Performance Assurance at a University Building," Cool Sense National Forum on Integrated Chiller Retrofits, San Francisco, Calif, LBNL Report—40781, 18 pages, Sep. 1997.
Talkingthermostats.com, "Comfort Solutions for Persons Who are Blind or have Low Vision, VIP 3000 Residential Talking Thermostat that Promotes Independent Living," 2 pages, on or before Aug. 19, 2011.
Venstar, "Comfort Call System ACCO433 Owner's Manual," 24 pages, Aug. 2007.
Walters, "Siri Hack Allows Voice Control of Home Thermostat," found at http://www.extremetech.com/computing/106073-siri-hack-allows-voice-control-of-home . . . , 2 pages, Nov. 21, 2011.
Watt, "Development of Empirical Temperature and Humidity-Based Degraded-Condition Indicators for Low-Tonnage Air-Conditioners," Thesis, ESL-TH-97/12-03, 205 pages, Dec. 1997.
Watt, "Predictive Maintenance Programs (PMP's) in Small HVAC Applications: Analysis of Available Products and Technology," ESL Report from Paper Prepared for MEEN 662, 4 pages, Apr. 1994.
Web.archive.org/web20030215020919/http:www.jdstechnologies.com/stargate.html, "Stargate Interactive Automation System: JDS Technologies," 9 pages, printed May 9, 2013.
Lennox, "icomfort Wi-Fi Thermostat, Touch Screen Programmable Communicating Thermostat," Homeowner's Manual, 21 pages, Sep. 2012.
Extended European Search Report for EP Application No. 14806841.4, dated Jan. 24, 2017.

* cited by examiner

USER INTERACTION WITH BUILDING CONTROLLER DEVICE USING A REMOTE SERVER AND A DUPLEX CONNECTION

This application is a continuation-in-part of U.S. patent application Ser. No. 14/463,708, filed Aug. 20, 2014 and entitled "Devices and Methods for Interacting with an HVAC Controller", which claims the benefit of U.S. Provisional Application Ser. No. 61/868,441, filed Aug. 21, 2013, entitled "Devices and Methods for Interacting with an HVAC Controller", both of which are incorporated herein by reference.

TECHNICAL FIELD

The present disclosure relates generally to building control systems, and more particularly to building controllers that accommodate and/or facilitate control of a building's environment.

BACKGROUND

Building control systems are often used to help control a building's environment. Building control systems are often used to control the temperature, humidity, air quality, lighting, security and other aspects of a building's environment. An example building control system may include a Heating, Ventilation, and/or Air Conditioning (HVAC) system used to control the comfort level within a building. Such HVAC systems typically include an HVAC controller that controls various HVAC components of the HVAC system in order to affect and/or control one or more environmental conditions within the building. An example building control system may include a lighting controller that controls the lighting in the building. Another example building control system may include a security system controller that controls the security of the building. Another example, building control system may include an HVAC control module, a lighting control module, and a security system control module, all integrated into a common housing or set of housings.

Such building controllers typically have a user interface for allowing a user to interact with the building controller. The user interface is often integral with the building controller housing, but in some instances, can be remote from the building controller but in direct or indirect communication therewith, such as when using a user interface of a smart phone, tablet computer, personal computer, laptop etc.

SUMMARY

The present disclosure pertains generally to building control systems, and more particularly to building controllers that accommodate and/or facilitate control of one or more building control systems via voice control. In one illustrative embodiment, a building controller device may be configured to control one or more building automation components of a building automation system. Such a building controller device may include a housing configured to house an environmental sensor, a microphone, and a controller operatively coupled to the environmental sensor and the microphone. In some instances, the controller may be configured to identify an audio trigger received by the microphone, and in response to identifying the audio trigger, establish a duplex connection between the building controller device and a remote server.

In an illustrative method of operating and/or controlling a building controller device of a building automation system, the building controller device may identify a received trigger. In response to identifying the trigger, the building controller device may initiate and/or establish a duplex connection between the building controller device and a remote server.

In some instances, a server may be configured to communicate with one or more building controller devices of one or more building automation systems. Such a server may include a communications module and a voice interaction module operatively coupled to the communications module. The communications module may be capable of establishing a duplex connection with a building controller device upon a request by the building controller device. The voice interaction module may be configured to provide an interactive audio dialog with a user of the building controller device by identifying one or more words in a voice stream received from the building controller device over the duplex connection, and in response, sending a return voice message to the building controller device over the duplex connection.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
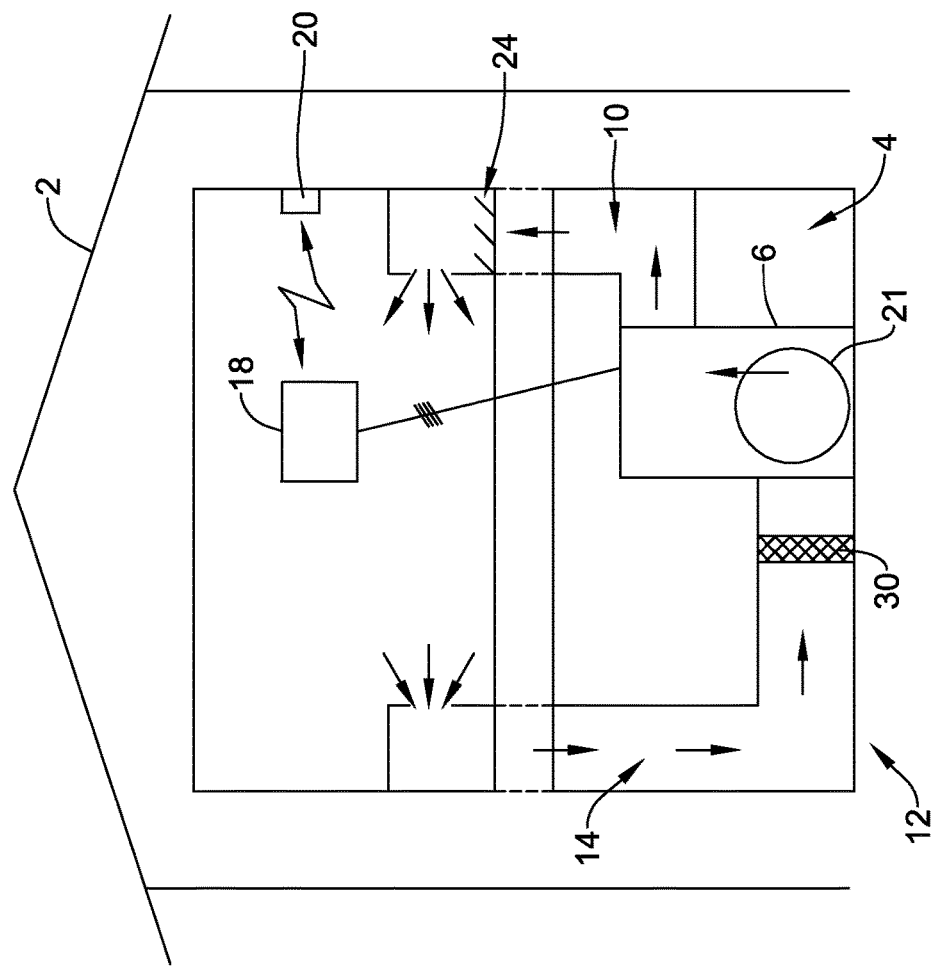
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

FIG. 1 is a schematic view of a building 2 having an illustrative building automation system 4. While FIG. 1 shows a typical forced air type HVAC system as an illustrative building automation sub-system 12 of a building automation system 4, other building automation sub-systems 12 of a building automation system 4 are contemplated including, but not limited to, security systems, lighting control systems, water heater systems (e.g., boiler systems), refrigerators, clothes washers, clothes dryer, ovens, garage doors, radiant heating systems, electric heating systems, cooling systems, heat pump systems, any other suitable sub-system 12 of building automation systems 4, and/or portions thereof, as desired. In some cases, building automation systems 4 may include an internet gateway 20 (e.g., a modem, router, and/or other device facilitating a communication link) or other device that may allow one or more components of the building automation system (e.g., one or more HVAC components 6) to communicate over a wide area network (WAN) such as, for example, the Internet, and/or a device 20 that may allow one or more HVAC components 6 to communicate over any other network.

The illustrative HVAC system of FIG. 1 includes one or more HVAC components 6, a system of ductwork and air vents including a supply air duct 10 and a return air duct 14, and one or more building automation controllers 18 (e.g., HVAC controllers). The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that a building automation controller(s) 18 may be configured to activate, deactivate and/or otherwise modulate the building automation sub-system(s) 12 thereof (e.g., including HVAC components 6) in a controlled manner (e.g., to control the comfort level in the structure or building 2 and/or otherwise operate electronic features of the building 2). The building automation controller(s) 18 may be configured to control the building automation controller devices or building automation sub-systems 12 via a wired and/or wireless communication link 20.

In some cases, the building automation controller(s) 18 may be a thermostat, such as, for example, a wall mountable thermostat or intelligent power switch (e.g., power switch for controlling appliances not equipped with communications capabilities and other appliances), but this is not required in all instances. An example thermostat may include (e.g. within the thermostat housing), or have access to, a temperature sensor for sensing an ambient temperature at or near the thermostat. In some instances, the building automation controller(s) 18 may be a zone controller (e.g., which may or may not be embodied in a thermostat), or may include multiple zone controllers each monitoring and/or controlling the comfort level within a particular zone in the building or other structure.

In the illustrative building automation system 4 shown in FIG. 1, the HVAC component(s) 6 may provide heated air and/or cooled air via the ductwork 10, 14 throughout the building 2. As illustrated, the HVAC component(s) 6 may be in fluid communication with every room and/or zone in the building 2 via the ductwork 10 and 14, but this is not required. In operation, when a heat call or command signal is provided by the building automation controller(s) 18, an HVAC component 6 (e.g., a forced warm air furnace) may be activated to supply heated air to one or more rooms and/or zones within the building 2 via supply air ducts 10. The heated air may be forced through the supply air duct 10 by a blower or fan 21. In this example, the cooler air from each zone may be returned to the HVAC component 6 for heating via return air ducts 14. Similarly, when a cool call or command signal is provided by the building automation controller(s) 18, an HVAC component 6 (e.g. air conditioning unit) may be activated to supply cooled air to one or more rooms and/or zones within the building or other structure via supply air ducts 10. The cooled air may be forced through the supply air duct 10 by the blower or fan 21. In this example, the warmer air from each zone may be returned to the HVAC component 6 (e.g. air conditioning unit) for cooling via return air ducts 14.

In some cases, the system of vents or ductwork 10 and/or 14 may include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an opened position, a closed position, and/or a partially opened position to modulate the flow of air from one or more HVAC components 6 to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and/or other pollutants from the air inside the building 2. In the illustrative example shown in FIG. 1, the air filter(s) 30 are installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component 6.

Figure 3:
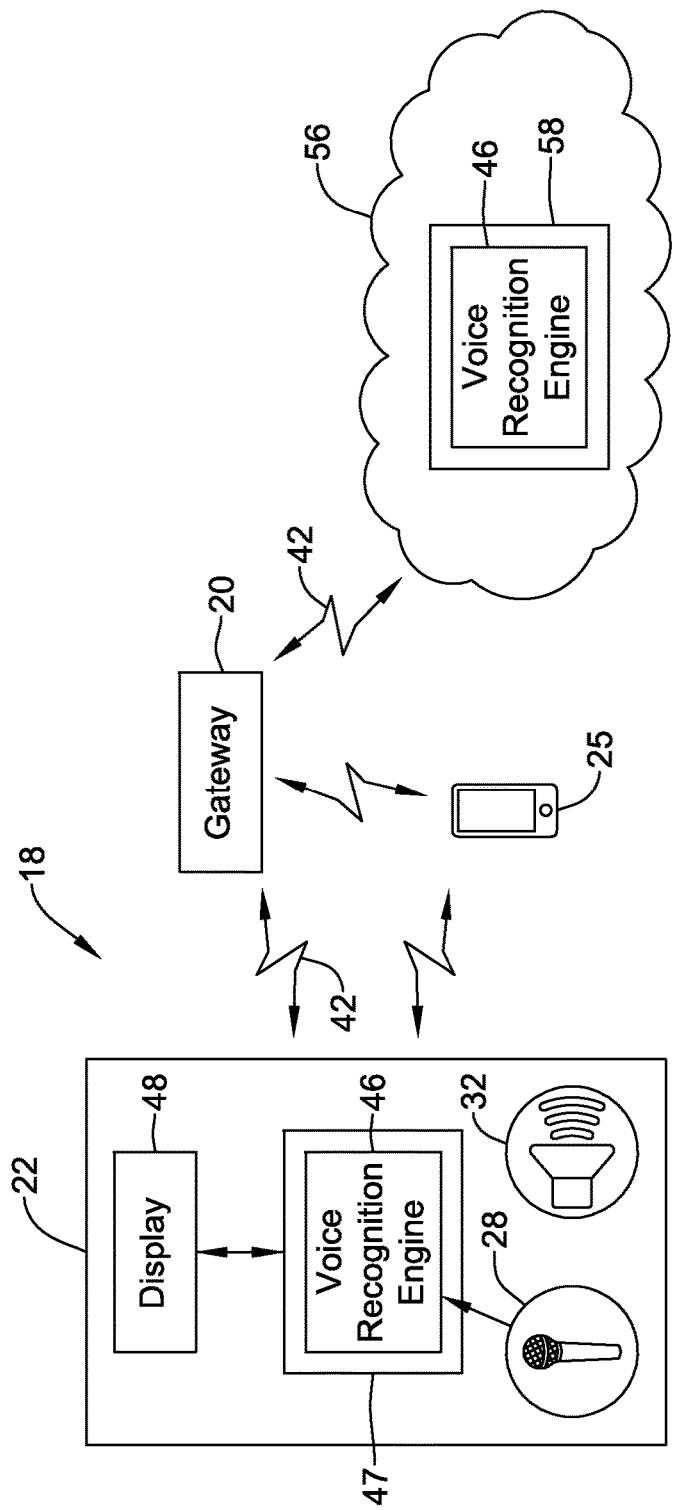
FIG. 3 is a schematic view of an illustrative thermostat interface network structure.

Depending upon the application and/or where the building automation system user is located, remote access and/or control of the building automation controller 18 may be provided, at least partially, over a first network (e.g. a local WiFi network) and/or a second network (e.g. a wide area network such as the Internet), as shown in FIG. 3. In some instances, the first network and/or the second network may collectively be considered a network. A non-limiting example of a network connected building automation system is described in U.S. patent application Ser. No. 13/559,470, entitled METHOD OF ASSOCIATING AN HVAC CONTROLLER WITH AN EXTERNAL WEB SERVICE, filed Jul. 26, 2012, and hereby incorporated by reference in its entirety. Another non-limiting example of a network connected building automation system is described in U.S.

patent application Ser. No. 13/875,213, entitled DEVICES AND METHODS FOR INTERFACING WITH AN HVAC CONTROLLER, filed May 1, 2013, and hereby incorporated by reference in its entirety. Yet another non-limiting example of a network connected building automation system is described in U.S. application Ser. No. 13/911,638 entitled INTERACTING WITH A CONTROL SYSTEM THAT IS CONNECTED TO A NETWORK, filed on Jun. 6, 2013, which is hereby incorporated by reference in its entirety.

In some instances, a user may use the building automation controller 18 (e.g., a thermostat 22) to adjust a parameter of the building automation system 4 or to initiate an action of the building automation system 4 in a hands-free and/or eyes-free manner. A user might not be able to, or may not wish to, interact with a typical touch user interface of the thermostat 22 or of a device in communication with the thermostat 22 (e.g. smart phone) for one or more reasons. For example, in some cases, a user may not physically interact with the user interface of the thermostat 22 because of what they are doing (e.g., hands are full of items as they are leaving home), where they are located (e.g., they are in a different room than the room where the thermostat 22 is located), inconvenience, disability, and/or because of any other reason.

In some cases, the thermostat 22 or other building automation controllers 18 may include a hands-free and/or an eyes-free user interface 26 that utilizes voice control, sometimes with audible confirmations (e.g., two-way audible communication). Non-limiting example thermostats 22 or other building automation controllers 18 that may utilize voice control and operations thereof are disclosed in: U.S. patent application Ser. No. 14/463,708 entitled "DEVICES AND METHODS FOR INTERACTING WITH AN HVAC CONTROLLER", which is incorporated herein in its entirety; U.S. patent application Ser. No. 14/463,712 entitled "DEVICES AND METHODS FOR INTERACTING WITH AN HVAC CONTROLLER", which is incorporated herein in its entirety; and U.S. patent application Ser. No. 14/463,714 entitled "DEVICES AND METHODS FOR INTERACTING WITH AN HVAC CONTROLLER", which is incorporated herein in its entirety.

Figure 2:
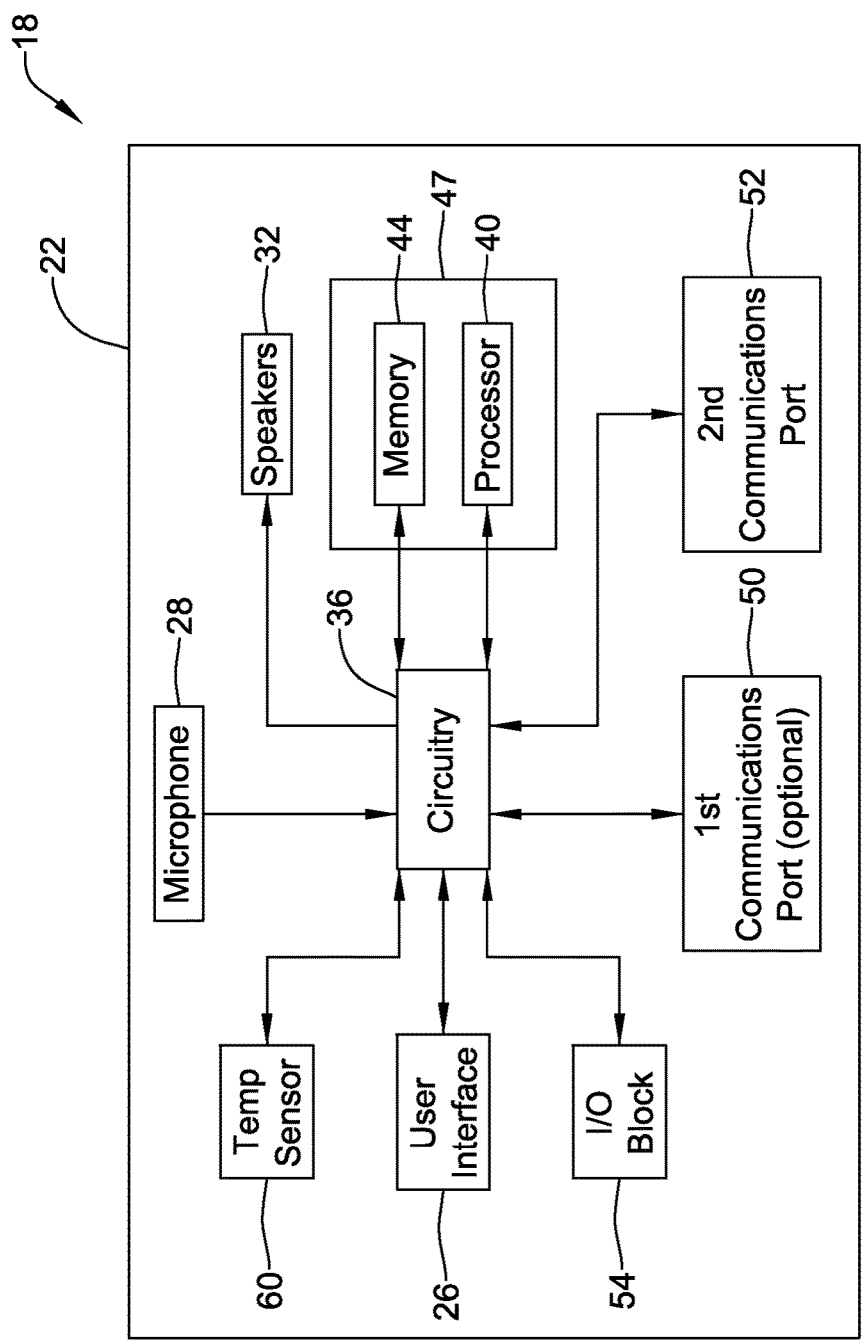
FIG. 2 is a schematic block diagram of an illustrative HVAC controller.

As illustrated in FIG. 2, the thermostat 22 may include one or more embedded or connected microphone(s) 28 and/or one or more embedded speakers or connected speakers 32, along with support circuitry 36 to allow the thermostat 22 to receive, record, and/or playback sound. Further, the thermostat 22 may include a controller 47 that includes a processor 40 and a memory 44 to further facilitate receiving, recording, and/or playing back sound, along with facilitating other functionality of the thermostat 22. The microphone 28, the user interface 26, the temperature sensor 60 or other environmental sensor, the input/output block 54, the communications ports 50, 52, the speakers 32, and/or the controller 47 may be at least partially enclosed in or housed by a housing or casing of the thermostat 22 or other controller.

The microphone(s) 28 and the speaker(s) 32, as shown for example in FIG. 2, may be provided integrally with the thermostat 22 or otherwise connect to the thermostat 22 and may be in communication with the support circuitry 36 of the thermostat 22 to communicate with other features of the thermostat 22 (e.g., the memory 44, the processor 40, the first communications port 50, the second communications port 52, and/or the user interface). In some instances, the speaker(s) 32 and/or the microphone(s) 28 may be integral with the user interface 26 of the thermostat 22 and in some instances, the microphone(s) 28 and/or the speaker(s) 32 may be separate from the user interface 26 of the thermostat 22.

Illustratively, a plurality of microphones 28 may be provided integrally with, or in communication with, the thermostat 22, where the plurality of microphones 28 may be provided to increase the functionality and/or improve the performance of the thermostat 22. For example, a plurality of microphones positioned in or otherwise in communication with the thermostat 22 may allow for noise cancellation functionality at the thermostat 22 or in the cloud 56, echo cancellation functionality at the thermostat 22 or in the cloud 56, beam forming or spatial filtering functionality (e.g., the ability to determine from which direction a voice is coming and remove unwanted noise) at the thermostat 22 or in the cloud 56, increase the area from which sound may be reliably obtained (e.g., especially when the microphones face different directions), and/or increase the functionality and/or improve the performance of the thermostat 22 in any other suitable way.

In some cases, the thermostat 22 may include a timer, sometimes implemented by support circuitry 36 and/or processor 40. The thermostat 22 may also include an input/output block (I/O block) 54 for receiving one or more signals from components of the building automation system 4 and/or for providing one or more control signals to components of the building automation system 4. Alternatively, or in addition, the I/O block 54 may communicate with another controller, which may be in communication with one or more HVAC components of the building automation system 4, such as a zone control panel in a zoned HVAC system, Equipment Interface Module typically located remote from the thermostat 22, and/or by or near one or more building system components, or any other building control device.

The illustrative thermostat 22 may include an environmental sensor (e.g., an internal temperature sensor 60, an internal humidity sensor, etc.), but this is not required. In some cases, the thermostat 22 may communicate with one or more remote temperature sensors, humidity sensors, microphone/audio sensors, speakers, displays, and/or occupancy sensors located throughout the building or structure. Also, the thermostat 22 may communicate with a temperature sensor, humidity sensor, and/or other sensor located outside of the building or structure for sensing an outdoor temperature and/or humidity if desired.

The processor 40 of controller 47 may operate in accordance with one or more algorithms that control or at least partially control the operation of the thermostat 22. The processor 40 may, for example, operate in accordance with a control algorithm that controls one or more building components, and may set or control temperature set points, humidity set points, schedules, start and end times, window frost protection, operating modes, and/or the like. At least a portion of the control algorithm may be stored locally in the memory 44 of the thermostat 22 and, in some cases, may be updated and/or programmed from an external web service over one or more of the first network and the second network. The control algorithm (or portion thereof) stored locally in the memory 44 of the building automation controller 18 may be updated in accordance with a predetermined schedule (e.g. once every 24 hours, 48 hours, 72 hours, weekly, monthly, etc.), updated in response to published changes to the control algorithm, updated in response to a user's request, and/or updated at any other time, as desired. The updates to the control algorithm or a portion of the control algorithm stored in the memory 44 may be received from an external web service over one or more of the first network and the second network. In some cases, the portion of the control algorithm that is updated may include settings such as set points, schedule times, and/or other settings, but this is not required.

In some instances, the processor 40 may operate according to a first operating mode having a first temperature set point, a second operating mode having a second temperature set point, a third operating mode having a third temperature set point, and/or the like, where the temperature set points may be different values or the same value. In some cases, the first operating mode may correspond to an occupied mode and the second operating mode may correspond to an unoccupied mode. In some cases, the third operating mode may correspond to a holiday or vacation mode wherein the building or structure in which the building automation system 4 is located is expected to be unoccupied for an extended period of time. In other cases, the third operating mode may correspond to a sleep mode wherein the building occupants are expected to be either asleep or inactive for a period of time. These are just some examples. It will be understood that the processor 40 may be capable of operating in additional or fewer modes, as necessary or desired.

The number of operating modes and/or the operating parameter settings associated with each of the operating modes may be established locally through a user interface, and/or through an external web service and delivered to the thermostat 22 via one or more of the first network and the second network where they may be stored in the memory 44 for reference by the processor 40.

In some cases, the processor 40 may operate according to one or more predetermined operating parameter settings associated with a user profile associated with a particular individual user. The user profile may be stored in the memory 44 of the building automation controller 18 and/or may be hosted by an external web service and stored on an external server 58. The user profile may include one or more user-selected settings for one or more operating modes that may be designated by the user. For example, the processor 40 may operate according to a first operating mode having a first temperature set point associated with a first user profile, a second operating mode having a second temperature set point associated with the first user profile, a third operating mode having a third temperature set point associated with the first user profile, and/or the like, where the temperature set points may be the same value or different values. In some cases, multiple user profiles may be associated with the thermostat 22. In certain cases, where two or more user profiles are associated with the thermostat 22, the processor 40 may be programmed to include a set of rules for determining which individual user profile takes precedence for controlling the HVAC system when both user profiles are active.

The memory 44 of the thermostat 22 may be in communication with the processor 40, as shown for example in FIG. 2 (e.g., through the support circuitry 36). The memory 44 may be used to store any desired information, such as the aforementioned control algorithm parameters, recorded voice messages, etc. The memory 44 may be any suitable type of storage device including, but not limited to, RAM, ROM, EPROM, flash memory, a hard drive, and/or the like. In some cases, the processor 40 may store information within the memory 44, and may subsequently retrieve the stored information from the memory 44. In some cases, the memory 44 may be part of the processor 40.

In the illustrative example shown in FIG. 2, the user interface 26, when provided, may be any suitable user interface that permits the thermostat 22 to provide and/or solicit information, as well as to accept one or more user interactions. For example, the user interface 26 may permit a user to locally enter data such as temperature set points, humidity set points, starting times, ending times, schedule times, diagnostic limits, responses to alerts, and/or the like. In some instances, the user interface 26 may be a physical user interface that is accessible at the thermostat 22, and may include a display 48, a microphone 28, a speaker 32, and/or a distinct keypad. The display may be any suitable display. In some instances, a display may include or may be a liquid crystal display (LCD), and in some cases a fixed segment display or a dot matrix LCD display. The user interface 26 may be or may include a touch screen LCD panel that functions as both a display and a keypad. The touch screen LCD panel may be adapted to solicit values for a number of operating parameters and/or to receive such values, but this is not required. In similar or other cases, the user interface 26 may be a dynamic graphical user interface. Alternatively, the user interface may be a voice only interface without a display and/or without non-voice input capabilities.

In some instances, the user interface 26 need not only be accessible to a user at the thermostat 22. Additionally, or alternatively, to being accessible to a user at the thermostat 22, the user interface 26 may be a virtual user interface 26 that is accessible via the first network and/or second network using a mobile wireless device or other device such as one of the remote devices described herein.

In some cases, the user interface 26 may include a hands-free, eyes-free user interface accessible through the microphone 28 and sometimes speaker 32 with optional feedback on the display 48. For example, the processor 40 may be configured to receive and accept user input entered via an audio and/or voice stream received via the microphone 28 (e.g., through interaction with one or more voice recognition engines), where the audio and/or voice stream may include user input related to temperature set points, humidity set points, starting times, ending times, schedule times, window frost protection settings, diagnostic limits, responses to alerts and/or any other suitable user input.

As shown in FIG. 2, the illustrative thermostat 22 (e.g., building automation controller 18) may include a first communication port 50 for communicating over a first network (e.g. a first wireless network, a first wired network, a wireless LAN, a wired LAN, WAN, the internet, etc.), a second communication port 52 for communicating over a second network (e.g. a second wireless network, a second wired network, a wireless LAN, a wired LAN, a WAN or the Internet), and/or one or more other communication ports. In one example, the first communication port 50 may be a wired or wireless communications port, and may include a transceiver for sending and/or receiving signals in a wired or wireless manner over a first network (e.g., wired and/or wireless network). The second communication port 52 may be a wired or wireless communication port including a transceiver for sending and/or receiving signals in a wired or wireless manner over a second network (e.g., a second wired or wireless network). In some cases, the second communication port 52 may be in communication with a wired or wireless router or gateway for connecting to the second network, but this is not required. In some cases, the router or gateway may be integral to the thermostat 22 or may be provided as a separate device.

In many cases, the thermostat 22 may be configured to communicate wirelessly over the first network and/or second network (e.g., to communicate with a remote device 25 and/or the cloud 56) via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired. In some instances, the thermostat 22 may utilize an open or proprietary protocol to communicate with other devices (e.g., a server 58 with data cache) and/or remote devices (e.g., mobile devices, voice reception boxes, etc.).

The present disclosure provides a mechanism where voice messages (e.g., contained in audio streams) recorded on a non-transitory computer readable medium (e.g., the memory 44) and/or streamed and then stored or recorded may be used as the messaging system between a user and an Internet connected thermostat 22. These voice messages, which may include voice commands, may be received, for example, from a user at the thermostat 22 and/or from a user via a remote device in the vicinity of the user issuing the voice commands. In one example, the thermostat 22 may be accessed and/or controlled through voice control (e.g., in a hands-free and/or eye-free manner) at the thermostat 22 with the microphone(s) 28 and the speaker(s) 32, and/or accessed and/or controlled from a remote location (e.g., remote from the thermostat 22) over the first network and/or second network with any suitable remote device 25 that has a microphone including, but not limited to, mobile phones including smart phones, PDAs, tablet computers, laptop or personal computers, wireless network-enabled key fobs, e-Readers and the like.

When a remote device 25 is used for accessing and/or controlling the thermostat 22 through voice control, it is contemplated that an application program may be downloaded and run on the remote device 25. The application program may facilitate the recording and/or processing of voice commands from a user.

In order to expand the communication capabilities to include, voice, touch, mouse, keyboard, or other interfaces from remote locations, infrastructure in addition to typical remote devices 25, the open or proprietary protocol, and/or the thermostat 22 may optionally be included in the networked infrastructure. Such additional infrastructure may include, for example, infrastructure of a cloud 56 (e.g., the Internet) and/or a server 58 in the cloud, as shown in FIG. 3.

The cloud or cloud infrastructure 56 (also known as, cloud computing) may include computing resources (e.g., hardware and/or software) capable of delivering a service over a network and capable of maintaining or storing a data cache. The data cache stored in the cloud infrastructure 56 may store information about the thermostat 22 or other controllers (e.g., other building automation system controllers or other controllers). For example, the data cache may store a current status, settings, a model number, type, and/or other information about the thermostat 22 and/or the user.

In some cases, the thermostat 22 may be programmed to communicate over the first network and/or the second network with an external web or cloud service hosted by one or more external servers 58 in the cloud 56. A non-limiting example of such an external web service is Honeywell's TOTAL CONNECT™ web service. Illustratively, the thermostat 22 may be configured to upload selected data via the second network to the external web service where it may be collected and stored on the external server 58. In some cases, the data may be indicative of the performance of the building automation system 4, building control settings, and/or recorded voice commands to be interpreted by a voice recognition engine 46 of the external web service into commands understandable to the thermostat 22. Additionally, the thermostat 22 may be configured to receive and/or download selected data, settings, and/or services including software updates from the external web service over the first network and/or the second network, and/or commands that are understandable to the thermostat 22. The data, settings, and/or services may be received automatically from the web service, downloaded periodically in accordance with a programmed algorithm, downloaded in response to a user request, and/or received in any other suitable way.

In the non-limiting example shown in FIG. 3, the thermostat 22 may be configured to receive and/or download from the cloud 56 or other source an HVAC operating schedule and/or operating parameter settings such as, for example, temperature set points, humidity set points, start times, end times, window frost protection settings, and/or the like. In some instances, the thermostat 22 may be configured to receive one or more user profiles having at least one operational parameter setting that is selected by and reflective of a user's preferences. In some instances, the thermostat 22 may be configured to receive local weather data, radar data, weather alerts and/or warnings, major stock index ticker data, and/or news headlines over the second network. These are just some examples.

In some instances, the external server 58 may receive and accept user input entered via the microphone 28, and associate the user input with a user's account on the external web service and/or on the thermostat 22. In some cases, if the user input includes changes to parameters associated with the existing control algorithm, including changes to any temperature set points, humidity set points, schedule, start and end times, window frost protection settings, operating modes, user profile changes, or any other suitable parameter, the external server 58 may identify the corresponding parameter, as applicable, and transmit the updated parameter value to the thermostat 22 over the first network and/or second network, where it is received via the first communication port 50 and/or second communication port 52 of the thermostat 22 and stored in the memory 44 for execution by the processor 40.

When voice messages or recordings are used to command the thermostat 22, it is contemplated that any suitable voice recognition software (e.g., VLINGO™, DRAGON™, etc.) may be used. Illustratively, the processor 40 of thermostat 22 may be configured to implement a limited voice recognition engine that is not intended to recognize all or most of the words in a dictionary, but may be configured to identify limited words and phrases such as a trigger phrase (e.g., an audio trigger in an audio voice stream or message received at or by the microphone 28) included in a voice message and/or in some cases, a limited command set. Such a configured processor 40 may allow the thermostat 22 to be controlled via voice control with fairly limited resources. Alternatively, a voice recognition engine may operate entirely from the thermostat 22 or other controller or operate entirely from a remote server 58.

At least a portion of a voice recognition engine 46 may be included within the thermostat 22. In FIG. 3, the voice recognition engine 46 is shown internal to a casing or housing of the thermostat 22 with a display 48, microphone(s) 28, speaker(s) 32, and a control module 47 that may provide one or more control signals to control one or more HVAC components 6 of the building automation sub-system 12 (e.g., an HVAC system). The control module 47 may include the memory 44 and processor 40 of FIG. 2, and the memory 44 may include instructions executable by the processor 40 to operate/communicate with the voice recognition engine 46. In addition, or alternatively, the thermostat 22 may interact with a voice recognition engine 46 (e.g., a voice recognition engine 46 on a web server or other server) via a communication link 42 (e.g., a wired or wireless communication link) and/or an internet gateway 20, as also shown in FIG. 3. In some cases, the voice recognition engine 46 on the thermostat 22 and the voice recognition engine 46 provided by a server 58, when both are provided, may cooperate to act like a single voice recognition engine 46 through communication over one of the communication ports 50, 52, or may act like separate voice recognition engines 46 in communication with one another over one or more of the communication ports 50, 52.

In some instances, the voice recognition engine 46 (e.g., including voice recognition software such as voice-to-text software and/or text-to-voice software) and translation software may be at least partially stored in the memory 44 of the thermostat 22, such that the thermostat 22 may directly receive, identify, and translate a voice message (e.g., an audio or voice stream) into a thermostat 22 understandable command. In one example of a thermostat responding to a natural language voice message, a user may issue one or more natural language voice messages to the thermostat 22 after a trigger phrase is identified (e.g., via the microphone 28 when the user is in the vicinity of the thermostat 22 and/or through a remote device 25). The thermostat 22 may receive the natural language voice message, translate the voice message to a command understandable by the thermostat 22, perform an action in response to the command, and/or respond to the received voice message with one or more of a natural language text based message, an audible natural language message as interpreted with text-to-voice voice recognition software, and/or a predetermined video message. Further, if the thermostat 22 communicates with or has one or more remote sensors, the voice recognition and translation software may additionally, or alternatively, be stored and operated in those sensors. For example, some thermostats 22 may have remote temperature sensors and/or remote control devices that may be placed in different rooms in the house, and the voice recognition engine(s) 46 may be at least partially embedded in one or all of these sensors and/or remote control devices.

When the voice recognition engine 46 of a controller 47 of the thermostat 22 identifies a trigger phrase in a received natural language voice stream, the voice recognition engine 46 may initiate processing of the natural language voice stream. In one example, the thermostat 22 may create a connection with a remote server 58 that may allow for a communication flow between an end user at the thermostat 22 (or other controller) and the remote server 58. In some instances the communication may last until the end user ends the communication by selecting a feature on the thermostat 22 (or a device in communication with the thermostat 22) or making a statement that the voice recognition engine 46 (e.g., the voice recognition engine 46 on one or more of the thermostat 22 and the remote server 58) recognizes as indicating the end user would like to end the dialog or connection.

The remote server 58 may be a single server, two servers or many servers remote from the thermostat 22 or other controller, which may act as a centralized voice processing unit for a plurality of thermostats 22 or other controllers. Such a configuration utilizing a remote server 58 may allow for the ability to scale server processing power and allow for the use of end user hardware devices (e.g., thermostats 22 and other controllers) that may have a relatively low processing power capability when compared to other end user hardware devices that have voice processing capabilities in addition to trigger phrase recognition at the end user device.

Figure 4:
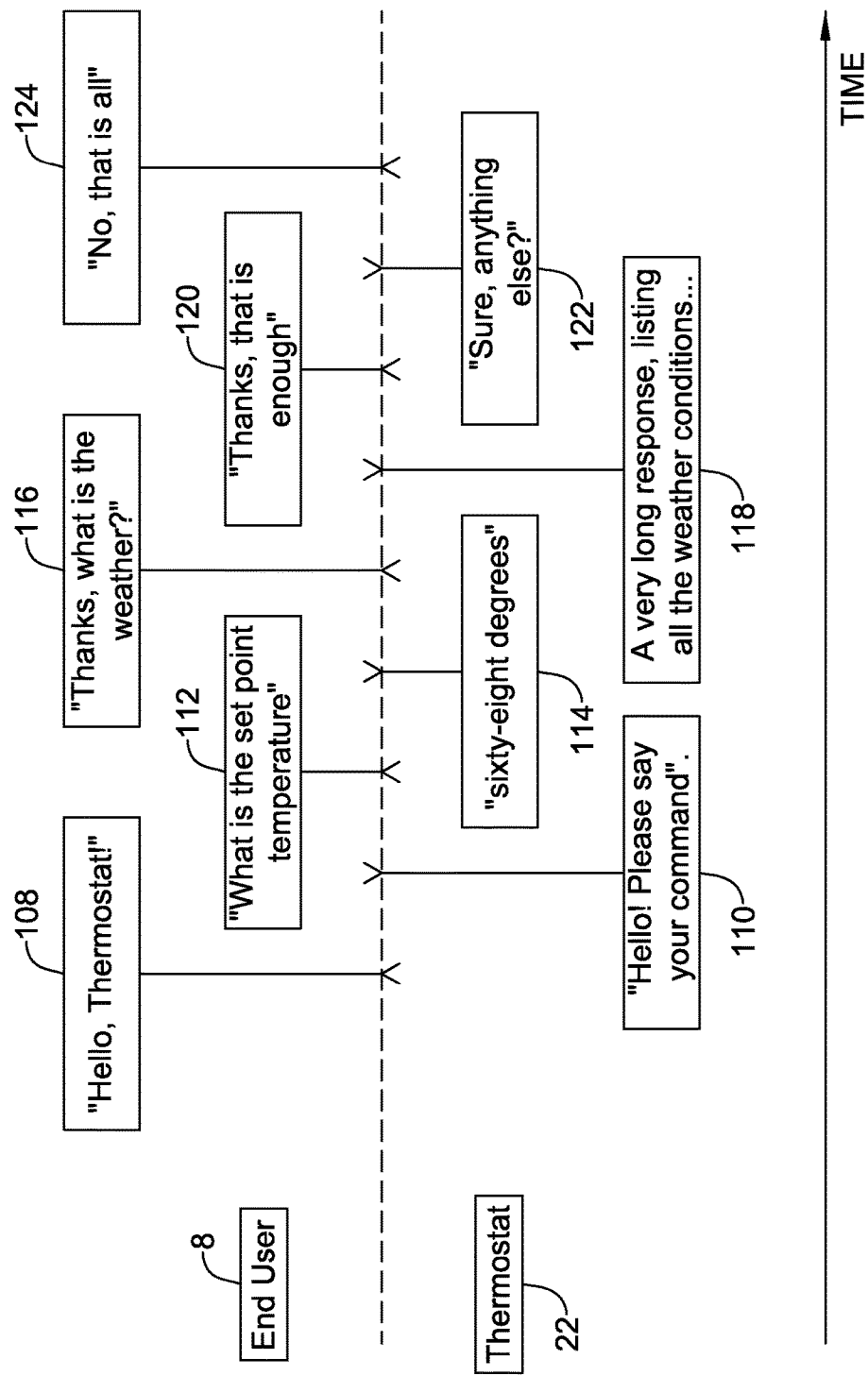
FIG. 4 is a schematic interaction diagram showing illustrative interactions between an end user and an HVAC controller.

FIG. 4 is an illustrative flow diagram of a relatively continuous communication between an end user 8 and a thermostat 22 (e.g., via the voice recognition engine 46 and the remote server 58). The communication between the end user 8 and the thermostat 22 may begin when an end user 8 verbalizes a trigger phrase (e.g., "Hello, Thermostat" or other trigger phrase) 108 or otherwise engages the thermostat 22, and the thermostat 22 creates a connection with the remote server 58 (discussed further below). Once a trigger phrase has been recognized by the thermostat 22 (e.g., by voice recognition engine 46), the thermostat may ask 110 the end user 8 to state a command (e.g., "Hello! Please say your command.", or other request for a command or further input). The end user 8 may then respond 112 by verbalizing a command (e.g., a question such as "What is the set point temperature?" or other question, or a command such as "Make it warmer", "Make it cooler", "Increase the set point temperature by two degrees", "Set the set point temperature to seventy degrees", or other direct command). In response to the received question or direct command from an end user 8, the thermostat 22 may answer and/or confirm 114 the question or direct command (e.g., the thermostat 22 may state the set point temperature is "Sixty-eight degrees" or indicate "The set point temperature has been changed to seventy degrees"). After a question or command has been answered and/or confirmed by the thermostat 22, the end user 8 may state a further command 116 (e.g., by stating "Thanks. What is the weather?" or other question or command) without entering a further trigger (e.g., trigger phrase) and the thermostat 22 may respond 118 to this further command by providing a response to the command. This back and forth may be conversational and may go on as long as desired.

In some instances, a response 118 from the thermostat 22 may be lengthy and an end user 8 may not want to hear the entire response or the end user 8 may realize it does not want a response to the verbalized command. In such instances, among others, an end user 8 may interrupt 120 or stop the thermostat 22 from starting or finishing a response (e.g., by stating "Thanks, that is enough" or a different comment, remark, and/or command the thermostat may recognize as an interruption). In response to the interruption, the thermostat 22 may prepare to close or end the communication session and respond to the interruption by asking 122 the end user 8 if the communication should end or proceed (e.g., by asking "Sure, anything else?" or by asking some other question or by stating a comment). Then, the end user 8 may respond 124 to the question (e.g., by stating "No. That is all" or some other statement recognizable as indicating the communication should end or by stating a further command) and the communication may continue or end as appropriate. In some instances, the end user 8 may not respond at all and the communication may be terminated after a set period of time (e.g., the communication may time out).

When an end user 8 desires to interrupt or stop a dialog received from the remote server 58 or being played at the thermostat 22 or other controller, the end user 8 may speak or provide a voice stream to the thermostat 22 or other controller, and the connected remote server 58 (e.g., a voice interaction processor or module 46) may identify one or more words in the voice stream from the end user 8 as indicating the current audio or voice message that is currently being sent by the remote server 58 is no longer needed by the end user or is no longer applicable. Alternatively, an audio stream received from the remote server 58 and/or being played at the thermostat 22 or other controller may be interrupted by interacting with the user interface 26 of the thermostat 22, by a timing out after a last response by an end user 8, by the thermostat 22 sensing an end user 8 is not within a certain distance of the thermostat 22, and/or the audio stream received from the remote server 58 may be interrupted in one or more other manners.

Although an illustrative flow is described with respect to FIG. 4, it is contemplated that the two-way conversation or dialog between the end user 8 and the thermostat 22 (e.g., thermostat 22 may be supported by the remote server 58 or other systems in communication with the thermostat 22) may take on any desired flow. For example, the conversation or dialog may last a single back and forth (e.g., to change a set point temperature) or last two or several communications back and forth (e.g., to ask a plurality of questions or state a plurality of commands concerning the operation of an HVAC system or concerning one or more other topics).

In some instances a two-way conversation or dialog between the end user 8 and the thermostat 22 may be initiated by the thermostat 22. For example, the two-way conversation or dialog may be initiated by the thermostat 22 when the thermostat 22 detects a presence of the end user 8 in the room, or upon a different occurrence.

Figure 5:
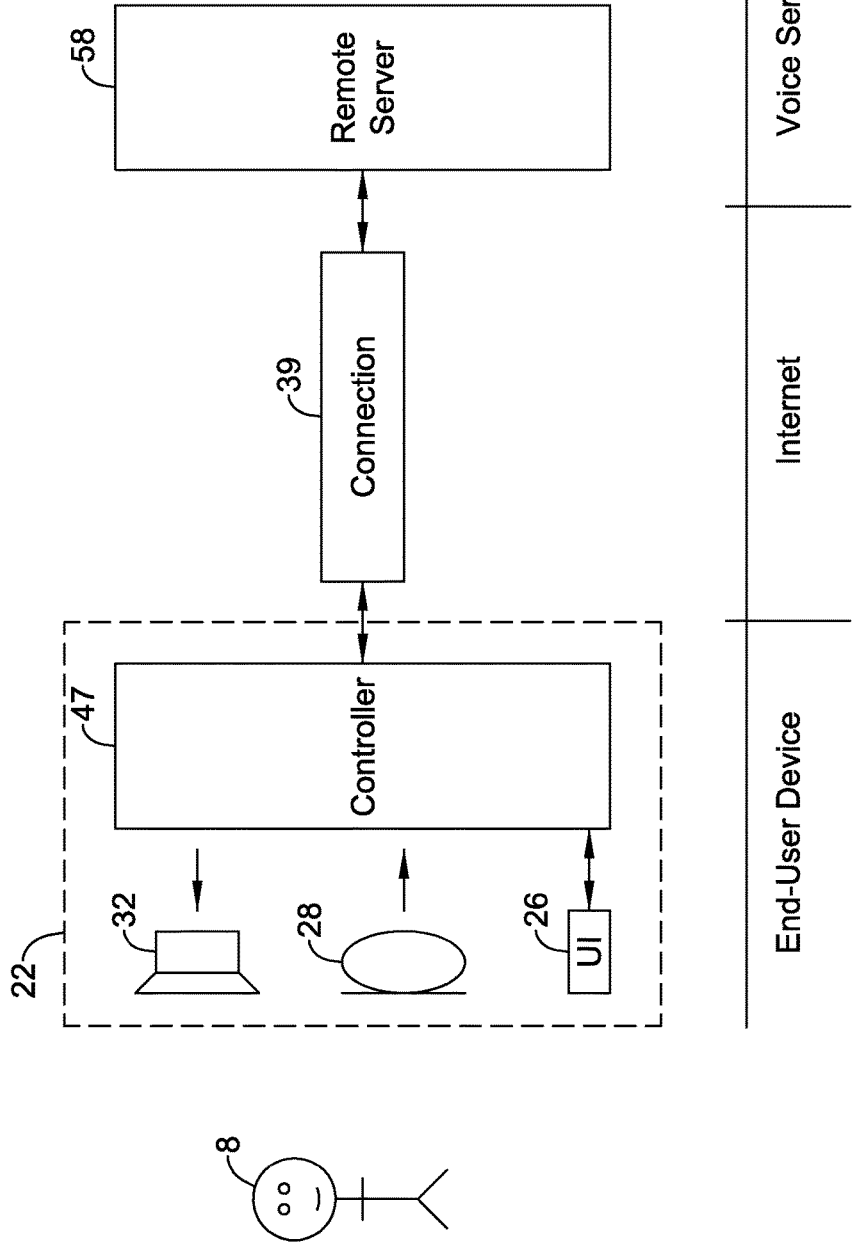
FIG. 5 is a schematic flow diagram showing illustrative interactions between an end user, a controller, and a remote server.

FIG. 5 is an illustrative overview of a system for communicating with a thermostat 22 or other building controller. In FIG. 5, an end user 8 may communicate with the thermostat 22 through the microphone 28, speaker(s) 32, and/or the user interface 26 (e.g., an LCD touch screen, an LCD screen, or any other user interface). In the example shown, in response to a detection of a trigger phrase (e.g., received through the microphone 28 or other mechanism) or other interaction with the thermostat 22, the thermostat 22 (e.g., the controller 47 or other portion of the thermostat 22) may establish and/or communicate with the remote server 58 through a connection 39 (sometimes single connection) over the internet to facilitate communication between the thermostat 22 and the end user 8. In response to identifying the trigger phrase and/or establishing a connection with the remote server 58, the speaker 32 of the thermostat 22 may play an audio voice message thereon that is received from the remote server 58 over the connection 39.

The connection 39 established between the thermostat 22 and the remote server 58 may be any type of connection. In one example, the connection between the thermostat 22 and the remote server 58 may be a half or a full duplex connection. A duplex connection may be a connection between two parties (e.g., a thermostat 22 or other controller and a remote server 58) that can communicate with one another in both directions. A full duplex connection is a connection in which communication may travel to and from each party simultaneously. A half-duplex connection is a connection in which communication is not able to travel to and from each party simultaneous, but rather, the communication is in one direction at a time.

In instances in which the duplex connection between the thermostat 22 and the remote serve 58 may be a full duplex connection, the connection may be made in one or more manners. In one example, the connection between the thermostat 22 and the remote server 58 may use a single Transmission Control Protocol (TCP) with any multi-channel existing (e.g., off-the-shelf) or custom-designed protocol. Illustratively, the multi-channel protocol may be, but is not limited to, a WebSocket protocol, a Real-time Transport (RTP or RTTP) protocol, and/or one or more other multi-channel protocols.

Figure 6:
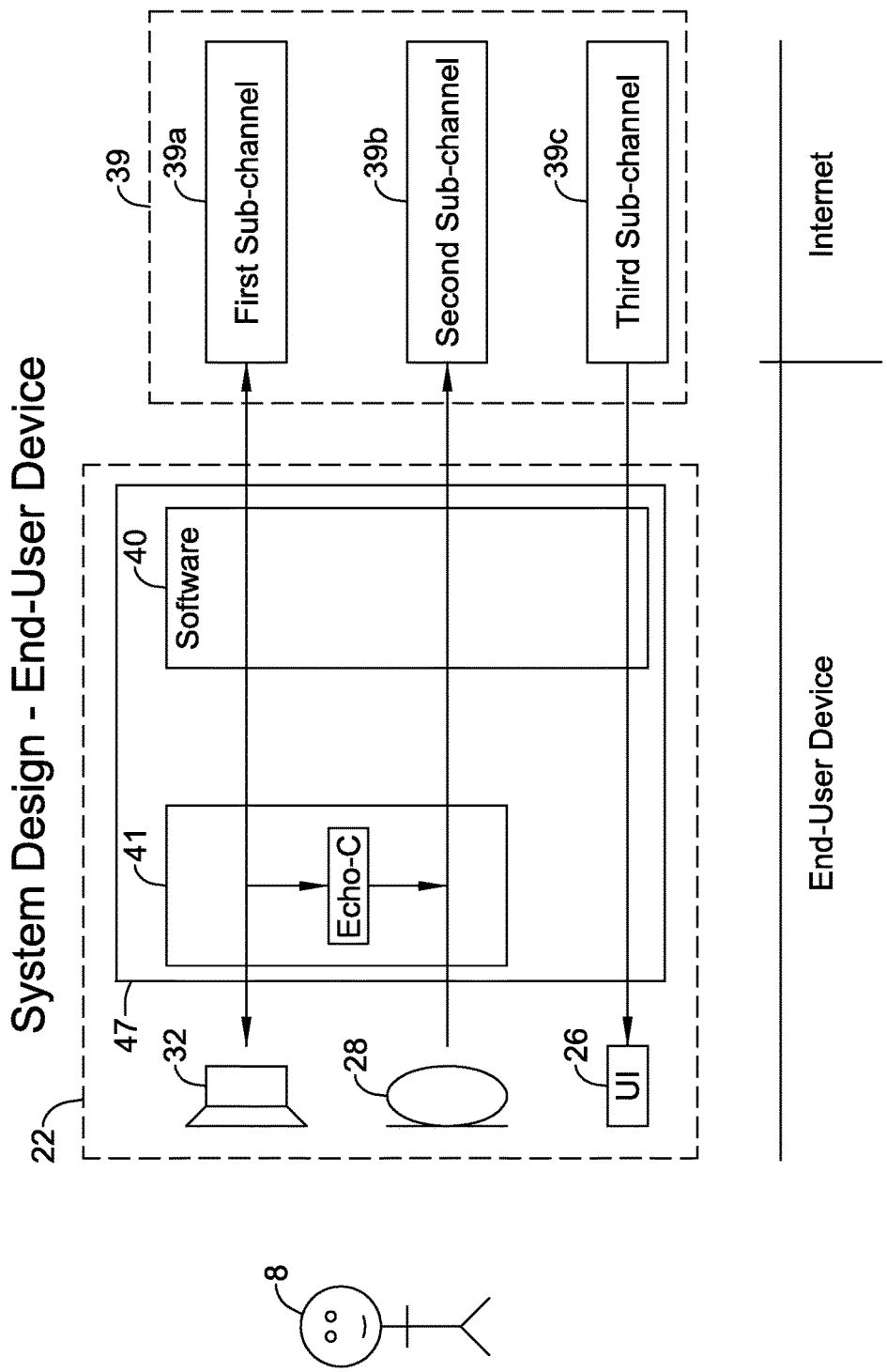
FIG. 6 is a schematic flow diagram showing illustrative interactions between an end user, a controller, and a connection between the controller and a remote server.

FIG. 6 depicts a thermostat 22 and a full duplex, connection 39 for communication between the thermostat 22 and the remote server 58. As shown in FIG. 6, the thermostat 22 may include the controller 47 with a processor 40 and a digital signal processor 41. Although the processor 40 and digital signal processor 41 are shown as separate elements, the processor 40 and the digital signal processor 41 may be implemented as a single processor or multiple processors, as desired.

The digital signal processor 41 may be configured to process signals received at the thermostat 22 (e.g., through the microphone 28 or other device in communication with the thermostat 22) and/or signals that are to be played through the speaker 32. In one example, the digital signal processor 41 may be configured to process out an echo or feedback from an audible output of the thermostat 22 through the speaker 32 that is heard by the microphone 28 of the thermostat 22.

The processor 40 may be configured to process signals to convert those signals to one or more of an audio sample and a signal that may be transported over the connection 39 to the remote server 58. In one example, the processor 40 may be configured to convert an audio sample received at the thermostat 22 from the end user 8 into a signal that may be configured to be transported over the connection 39. Similarly, the processor 40 may be configured to convert a signal that may be configured to be transported over the connection 39 into an audio sample to be played through the speaker 32 or other audio output of the thermostat 22.

The connection 39 (e.g., a full duplex connection) in FIG. 6 is shown with three sub-channels (e.g., a first sub-channel 39a, a second sub-channel 39b, and a third sub-channel 39c). In one example, each sub-channel 39a, 39b, 39c, may be a same or different WebSocket Path or RTP path or other multi-channel protocol path.

Illustratively, the sub-channels 39a, 39b, 39c may be configured or assigned to send data and/or signals from a specific feature to a specific feature for a particular purpose. In the example of FIG. 6, the first sub-channel 39a may be configured to receive a signal (e.g., audio data and/or other signal) from the remote server 58 and send the signal (e.g., audio data and/or other signal) to the thermostat 22 for providing output audio from the thermostat 22, the second sub-channel 39b may be configured to send a signal (e.g., audio data and/or other signal) from the thermostat 22 to the remote server 58 for processing content of an audio stream received at the thermostat 22, and the third sub-channel 39c may be configured to receive a signal (e.g., a thermostat 22 or other controller understandable command to change or modify at least one control parameter of the thermostat 22 or other controller, or other signal) from the remote server 58 and send the signal to the thermostat 22 to provide a control signal and/or display related command to the thermostat 22. The data and/or the signals sent and received over the sub-channels 39a, 39b, 39c may be sent and received simultaneously or otherwise overlap in time (e.g., the thermostat 22 or other controller may receive audio data from the remote server 58 over the first sub-channel 39a while sending audio data from the controller to the remote server over the second sub-channel). Although the one or more paths of the connection 39 are illustratively described, the paths of the connection 39 may have one or more other paths for one or more similar or different purposes.

Figure 7:
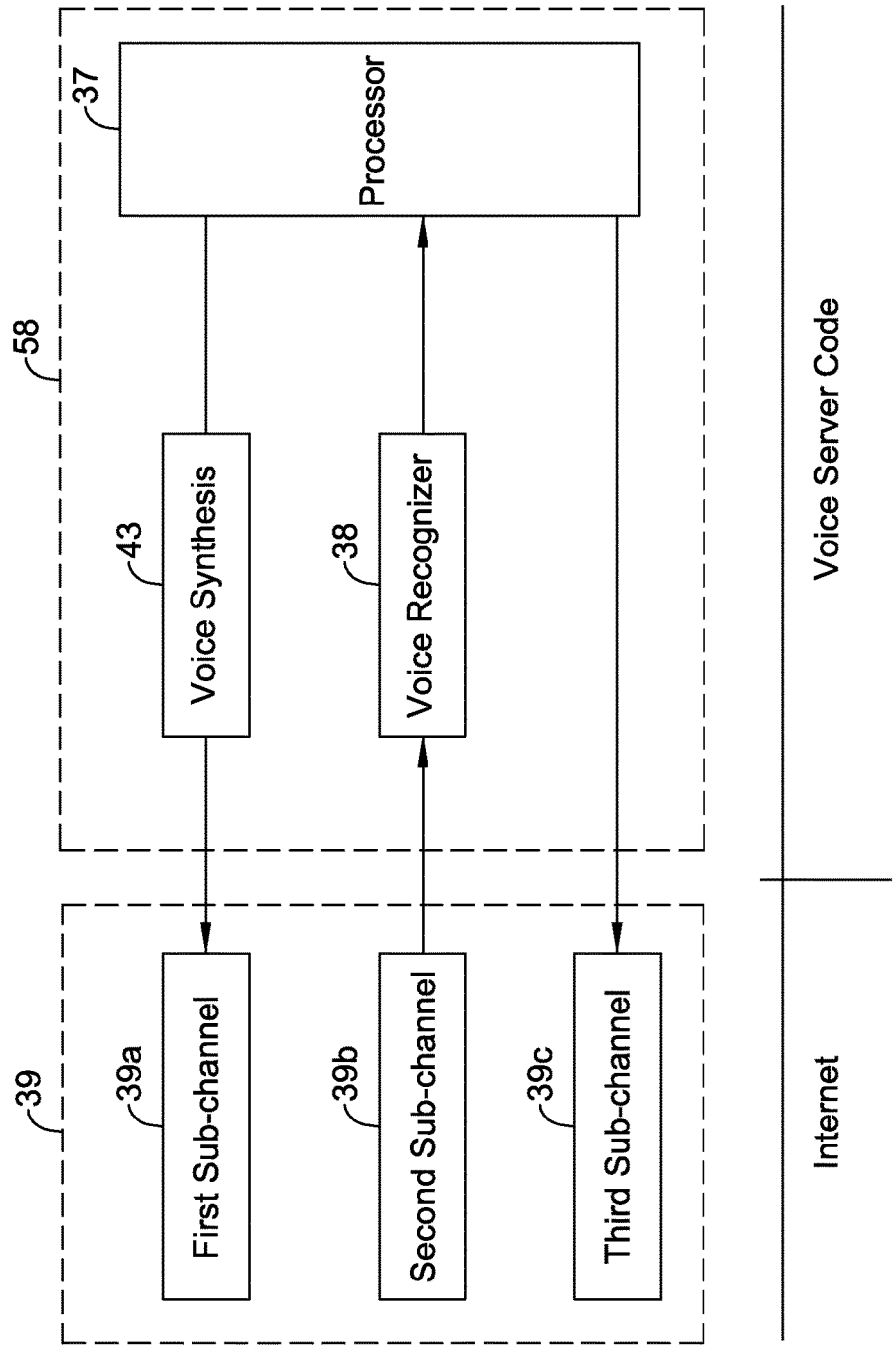
FIG. 7 is a schematic flow diagram showing illustrative interactions between a remote server and a connection between the controller and a remote server.

FIG. 7 is an illustrative depiction of a remote server 58 and a full duplex, connection 39 connecting the remote server 58 to a thermostat 22. The remote server 58 may include a voice interaction processor 37 (VIP), a voice synthesis block or processor 43, and a voice recognizer 38. The VIP 37, the voice synthesis block or processor 43, and the voice recognizer 38 may all be executed by one or more processors of the remote server 58.

The voice recognizer 38 may receive audio data from the second sub-channel 39*b*, as shown in FIG. 7, and in response, generate a text signal of the received audio data. The text signal may then be sent to the VIP 37 for processing and determining a response to an end user's 8 audio stream (e.g., command or question). In response to processing the text signal, the VIP 37 may determine and then send a text signal response to the voice synthesis block or processor 43 for conversion to an audio stream to be carried to the thermostat 22 over the first sub-channel 39*a*. In instances when two-way communication between the thermostat 22 and the remote server 58 is not to be simultaneous, the remote server 58 may have a gate between the second sub-channel 39*b* and the voice recognizer 38 to avoid detecting an audio signal when an audio signal is being sent to the thermostat 22 from the remote server 58. In some cases, in response to processing the text signal, the VIP 37 may send a user interface command (e.g., a command controlling the user interface 26 to provide further feedback for an end user 8) and/or thermostat command (e.g., a command for interacting with an HVAC component 6 in communication with the thermostat 22) to the thermostat 22 via the third sub-channel 39*c*.

In some instances, the VIP 37 may include one or more specific language analysis methods that may be implemented to analyze and/or process an audio stream or data received at the remote server 58. Further, the VIP 37 may be implemented on the remote server 58, such that the VIP 37 may be developed and/or tested independent from other portions of the remote server 58.

In some instances, the VIP 37 may be a progressive state device. For example, each audio stream received by the remote server 58 from the thermostat 22 may progress the state of the VIP 37. In response to the progression of the VIP 37, the VIP 37 may provide instantaneous responses (e.g., near instantaneous responses, as limited by processing power and/or an internet connection) to an end user 8 (or the thermostat 22) in response to an audio stream from the end user 8.

Figure 8:
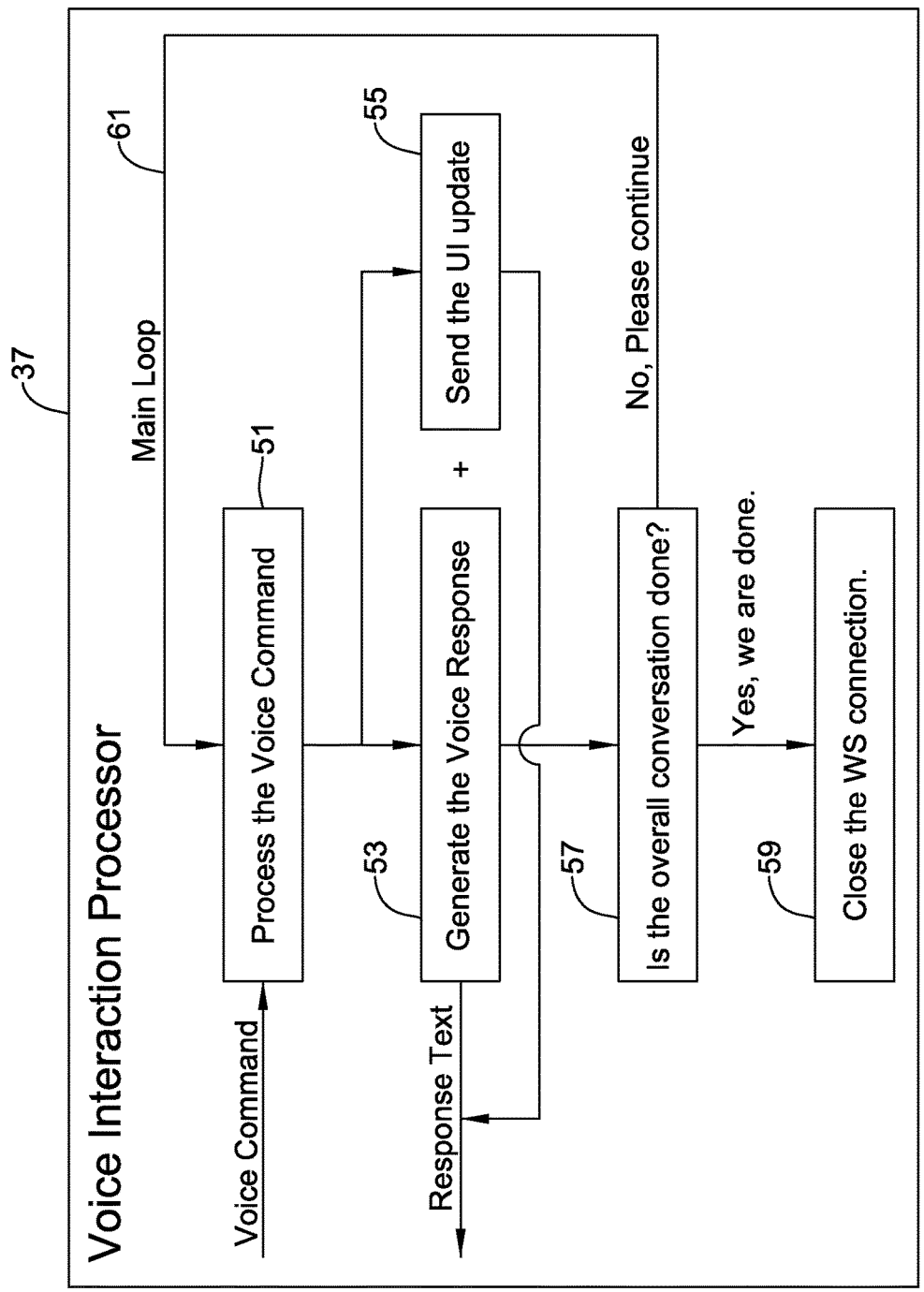
FIG. 8 is a schematic flow diagram showing illustrative operation logic of a voice interaction module of a remote server.

FIG. 8 illustrates an example flow of how the VIP 37 may operate to advance its state and facilitate communication between a thermostat 22 or other controller and an end user 8. Illustratively, the VIP 37 may receive an audio stream from the thermostat 22 (or a text signal from the voice recognizer 38) having a voice command, and may process the voice command 51. In response to processing the voice command, the VIP 37 may generate a voice response 53 to be sent to the thermostat 22 (or a text response to be sent to the voice synthesizer 43 for processing into a voice response) to respond to the voice command and/or send an instruction 55 to the thermostat 22 to display an action taken or response to the voice command on the user interface 26 of the thermostat 22. After providing a response to the received voice command, the VIP 37 may determine if the overall conversation is over at 57. If the overall conversation is determined by the VIP 37 to be over, the VIP 37 may initiate closing 59 the connection 39 between the remote server 58 and the thermostat 22. If the conversation is determined by the VIP 37 to be on-going, the VIP 37 may loop 61 back to process the next voice command 51 in the conversation.

Figure 9:
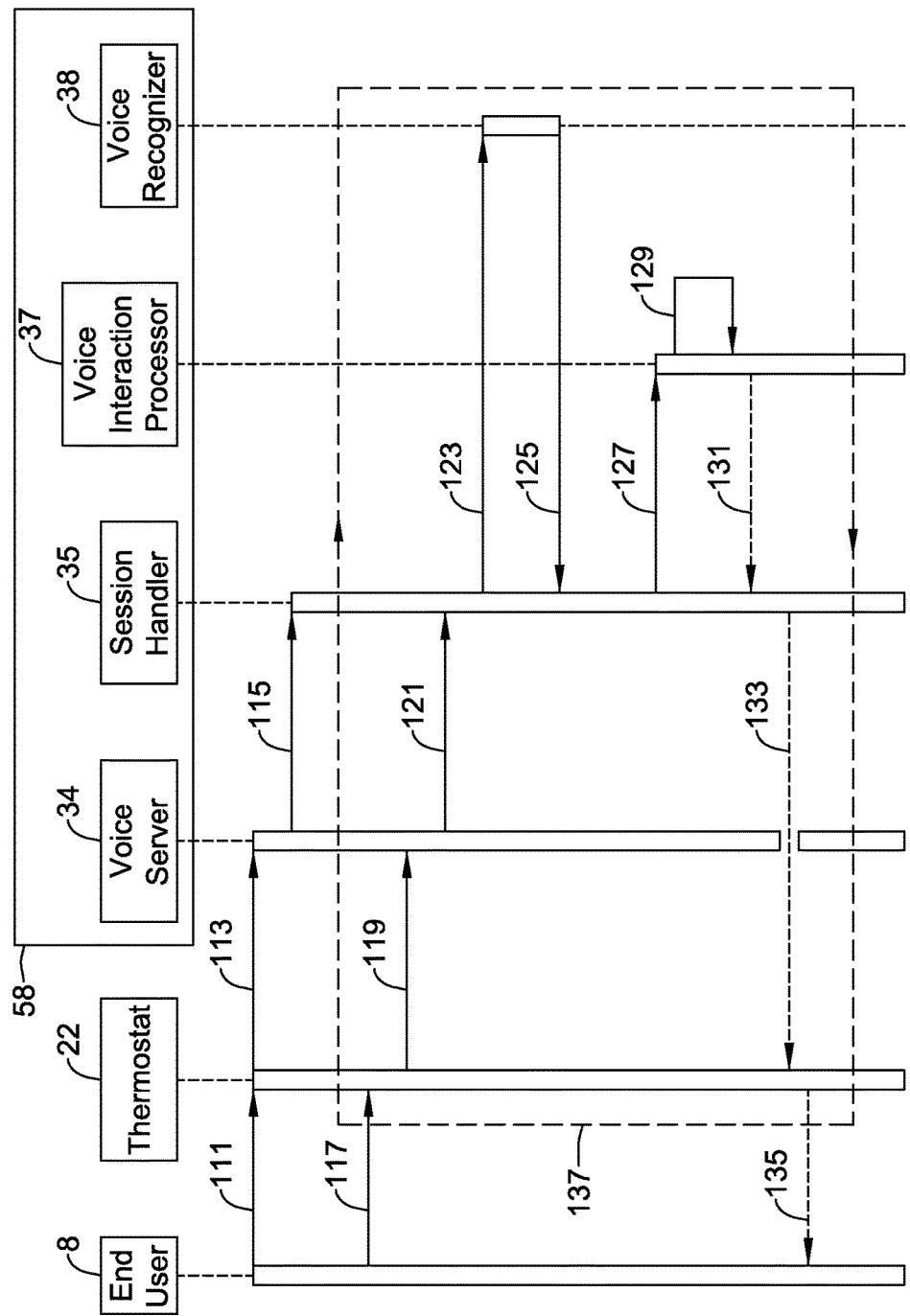
FIG. 9 is a schematic flow diagram showing illustrative interactions between an end user, a controller, and a remote server.

In one illustrative example of processing a natural language voice stream or voice data, as shown in the interaction diagram of FIG. 9, an end user 8 may interact 111 with the thermostat 22 or other voice enabled device, and once the thermostat 22 identifies a trigger phrase provided by the end user 8 while interacting with the thermostat 22, the thermostat 22 may establish a connection with a remote server 58 connected to the internet and/or in the cloud 56 (e.g., a server connected to the internet and a cloud service (e.g., where the cloud services includes one or more servers hosted in the cloud)), where the remote server 58 may include one or more servers and/or computing devices connected to the internet and/or in the cloud 56.

In some instances, the remote server 58 may include a voice server module 34 (e.g., a communications module), a session handler module 35, a voice interaction processor (VIP) module 37 (e.g., a voice interaction module), and a voice recognizer module 38 (e.g., the voice recognition engine 46 or a portion of the voice recognition engine 46). Alternatively, one or more of the voice server module 34, the session handler module 35, the VIP 37, and the voice recognizer module 38 may reside on the thermostat 22 or other controller, as desired.

Illustratively, as shown in FIG. 9, the voice server module 34 may receive the connection request from the thermostat 22 in response to the thermostat 22 identifying a trigger phrase, and then the voice server module 34 may establish the connection 113 (e.g., a duplex connection, such as a full duplex connection) and create 115 a session by assigning the connection with the thermostat 22 to a session handler of the session handler module 35. An end user 8 may say 117 a voice command that may be captured by the thermostat 22 and the thermostat 22 may send 119 voice/audio data associated with the voice command to the voice server module 34, where the voice/audio data may be directed 121 to the corresponding session created with the session handler module 35.

Once the session handler module 35 receives the voice/audio data, the session handler module 35 may send 123 the voice/audio data to the voice recognizer module 38 for conversion of the voice/audio data into a form recognizable by the VIP module 37 (e.g., a text format or other signal format). Once the voice/audio data has been converted by the voice recognizer module 38, the converted data may be sent back 125 to the session handler module 35 and delivered 127 to the VIP module 37, where the VIP module 37 may be configured to provide an interactive audio dialog with an end user 8 by identifying one or more words in the voice stream received from the thermostat 22 or other controller over the connection 39 and sending a return voice message to the thermostat 22 or other controller over the connection 39.

The VIP module 37 may analyze the converted data and generate a response 129 to the voice command based on one or more algorithms and/or data stored in or in communication with the VIP module 37. The response generated by the VIP module 37 may be sent 131 to the session handler module 35 and relayed 133 to the thermostat 22. Once, the response is relayed 133 to the thermostat 22, the thermostat 22 may present 135 the response to the user via an audio playback, a visual display on the thermostat 22, an alert on a remote device 25, and/or in any other suitable manner.

In some instances, a person may be utilized in addition to or as an alternative to the voice recognizer 38 outside of and in communication with the remote server 58. In one example, some or all voice data may be sent to a person and the person receiving the voice data may view or listen to the voice data and send an identified voice command, voice instruction or voice request to the session handler module 35 or the voice VIP 37 in a form recognizable thereby. Alternatively, or in addition, the person may supplement the voice recognizer in situations in which the voice recognizer 38 is unable to understand the content of the voice data received from the session handler. For example, if the voice recognizer 38 is unable to recognize received voice data after one or more attempts (e.g., one attempt, two attempts, three attempts, four attempts and so on) of received voice data from an end user 8, the session handler module 35 or the voice recognizer 38 may send the voice data from the end user 8 to a live person in communication with the remote server 58. The person in communication with the remote server 58 may then attempt to clarify the issue with the end user 8 through the established connection between the thermostat 22 and the remote server 58. Once the content (e.g., command) of the voice data has been identified by the person in communication with the remote server 58, the person in communication with the remote server 58 may send the content of the received voice data to the remote server 58 for processing by the session handler module 35 and/or the VIP 37, or for further processing by the voice recognizer 38. Alternatively, the person in communication with the remote server 58 may process the content of the voice data and send a response to the end user 8.

The communication between an end user 8 and the thermostat 22 depicted in FIG. 9 may be repeated in loop 137 to facilitate a continuing dialog between the end user and the thermostat 22. As discussed above, the end user 8 may terminate the dialog and/or communication at any time through one or more commands and recognition of that command by the thermostat 22 or remote server 58 (e.g., the voice interaction processor or module 37) and/or the thermostat 22 or remote server 58 (e.g., the voice interaction processor or module 37) may terminate the dialog and/or communication after timing out due to a lack of interaction by the end user with the thermostat 22.

Figure 10:
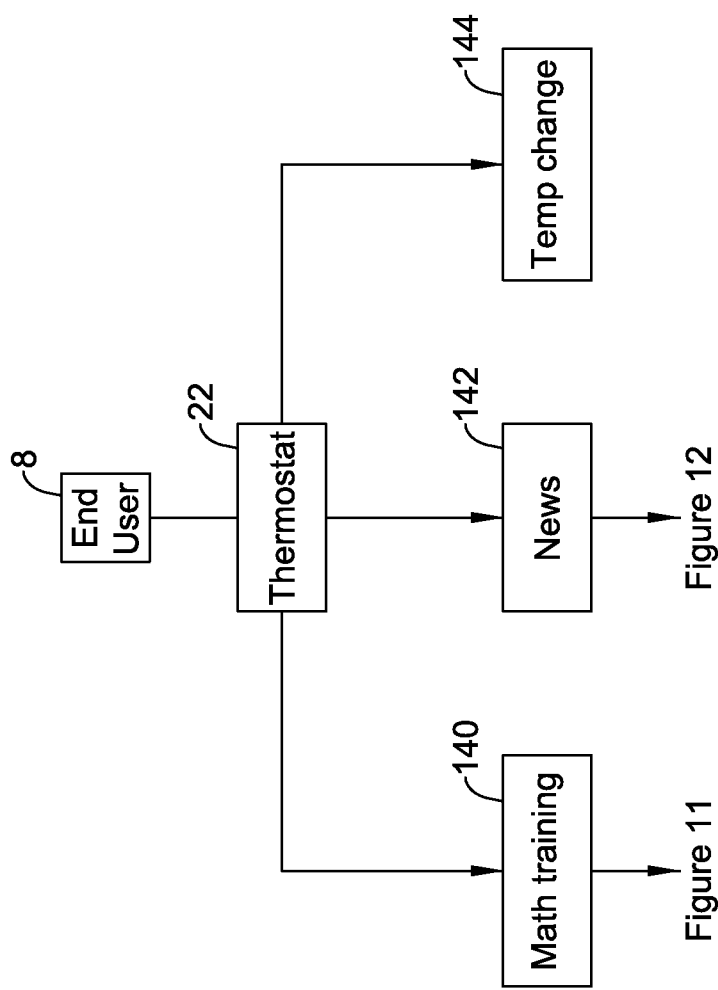
FIG. 10 is a schematic flow diagram showing illustrative interactions between an end user and a controller.

Although the thermostat 22 or other controller is described above as controlling a building automation system 4 or a building automation sub-system 12, such as an HVAC system, the thermostat 22 or other controller may be utilized for one or more other purposes. As shown in FIG. 10, the thermostat 22 or other controller may be a general controller capable of assisting an end user in one or more manners. In some examples, the thermostat 22 or other controller may be capable of working with an end user 8 on math training 140, discussing the news 142 with an end user 8, and/or controlling 144 the building automation system 4, as shown in FIG. 10. Alternatively, or in addition, the thermostat 22 or other controller may facilitate interactions with an end user 8 in one or more other manners.

The thermostat 22 or other controller may be able to identify (e.g., through the voice recognition engine 46) a command after identifying a trigger or trigger phrase, that requests a certain type of interaction. In the example of FIG. 10, once a dialog has been initiated with the thermostat 22 or other controller, or as a trigger phrase, an end user 8 may state "Make it warmer" or other term and the thermostat 22 or other controller may know to adjust a set point temperature of an HVAC system, an end user may state "Math training" or other term and the thermostat 22 or other controller may enter into a math training dialog (see FIG. 11), and an end user 8 may state "Give me the news" or other term and the thermostat 22 or other controller may enter into a news related dialog (see FIG. 12). Upon other identifiable commands or trigger phrases, the thermostat 22 or other controller may enter into one or more other dialogs.

Figure 11:
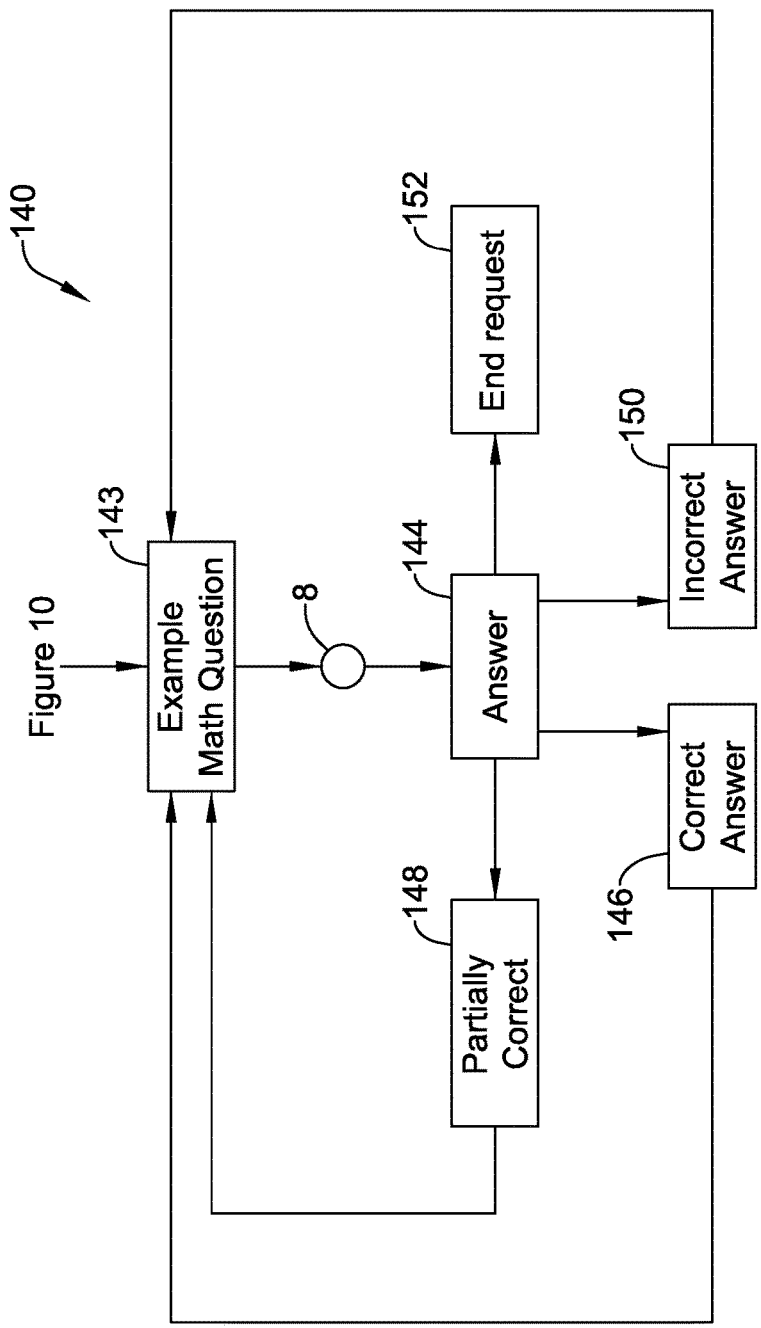
FIG. 11 is a schematic flow diagram showing illustrative math training interactions between an end user and a controller.

FIG. 11 depicts an illustrate flow of a math training dialog between an end user 8 and the thermostat 22 or other controller. In one example, once a math training dialog has begun, the thermostat 22 or other controller may state or display a math question 143, such as "How much is two plus three" or "2+3=?", or one or more other math questions. The end user 8 may then speak or enter an answer 144 to the math question. After receiving a correct answer, the thermostat 22 or other controller may reply 146 "Correct answer" or any other contextually relevant response and provide a further math question 143. After receiving an initially incorrect answer, but then a corrected answer by the end user 8, the thermostat 22 may reply 148 with "First wrong, but you've corrected yourself!" or "You were right with the first answer!" or any other contextually relevant response and provide a further math question 143. After receiving an incorrect answer, the thermostat 22 or other controller may reply 150 "Incorrect answer" and then state the correct answer, ask the end user 8 for another answer, or move on to the next math question 143. If the thermostat 22 or other controller receives an end request or times out from non-interaction therewith by the end user 8, the thermostat 22 or other controller may reply 152 with "Ending session" and end the math training session and terminate the dialog.

Figure 12:
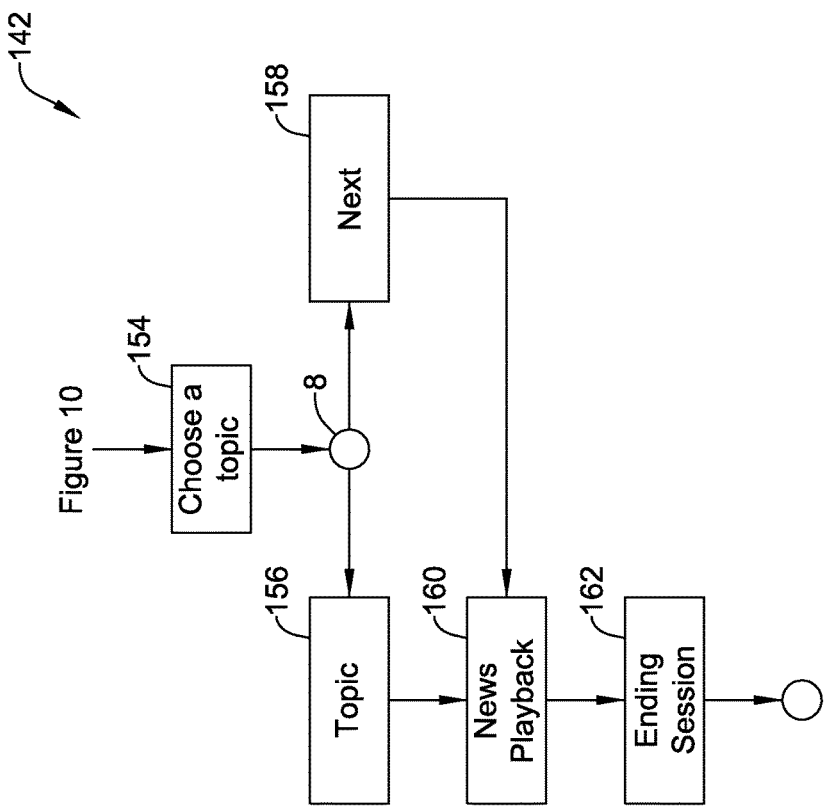
FIG. 12 is a schematic flow diagram showing illustrative news dialog interactions between an end user and a controller.

FIG. 12 depicts an illustrated flow of a news dialog between an end user 8 and the thermostat 22 or other controller. In one example, once a news dialog or discussion has begun, the thermostat 22 or other controller may state or ask an end user for a topic of news to be read or discussed 154 by asking or displaying "Would you like to hear news about topic a, topic b, or topic c?" or "What news topic would you like to cover?" or "Please state a news category." Alternatively, or in addition, the thermostat 22 or other controller may recognize a news category provided by the end user 8 without the end user being prompted 154. Once a user has specified a topic 156, the thermostat 22 or other controller may playback or recite 160 one or more news stories related to the topic stated by the end user. At any time during or after the relating of a news story about a selected topic, the end user may state "Next" or other similar command 158 or state another topic or category of news 142 and the thermostat 22 or other controller may move on to the next article or new topic. Alternatively, or in addition, the end user may ask a question about a topic at any time during when the time the thermostat 22 or other controller is reading the article and the thermostat 22 or other controller may respond to the question in the middle of the article. Once the question is answered, the thermostat 22 or other controller may ask if the question was answered sufficiently and/or ask if the end user 8 would like to go to the point in the article where the thermostat 22 or other controller left off. If the thermostat 22 or other controller receives an end request or times out from non-interaction therewith by the end user 8, the thermostat 22 or other controller may reply 162 with "Ending session" and end the news dialog session.

Although certain uses of the thermostat 22 or other controller have been described herein, other uses are contemplated. Additionally, although certain steps are point delineated in this description with respect to various operations, these steps are not limited to the recited order and/or context, unless clearly indicated, and the steps may be performed instantaneously and/or simultaneously in some instances. In one example, an end user 8 may say a trigger phrase and a command in one voice stream, and the thermostat 22 may create the connection with the remote server 58 and then relay the voice data of the command stated by the end user 8 automatically.

Other Examples

In a first example, a building controller device may be configured to control one or more building automation components of a building automation system, the building controller device comprising: a housing, the housing configured to house: an environmental sensor; a microphone; a controller operatively coupled to the environmental sensor and the microphone; and wherein the controller is configured to identify an audio trigger received by the microphone, and in response to identifying the audio trigger, establish a duplex connection between the building controller device and a remote server.

In a second example, the building controller device of the first example, wherein the audio trigger that may be a trigger phrase contained in an audio voice stream.

In a third example, the building controller device of the first example, wherein the audio trigger that may be identified by the controller of the building controller device.

In a fourth example, the building controller device of the first example may further comprise: a speaker at least partially housed by the housing; and wherein the controller is configured to play an audio voice message on the speaker, wherein the audio voice message is received from the remote server via the established duplex connection.

In a fifth example, the building controller device of the first example, wherein the established duplex connection between the building controller device and the remote server may include a plurality of sub-channels.

In sixth example, the building controller device of the fifth example, wherein the plurality of sub-channels may include a first sub-channel configured to send audio data to the remote server, a second sub-channel configured to receive audio data from the remote server, and a third sub-channel configured to receive one or more controller understandable commands from the remote server.

In a seventh example, the building controller device of the sixth example, wherein the controller of the building controller device may be configured to receive audio data from the remote server over the second sub-channel while at the same time send audio data from the controller to the remote server over the first sub-channel.

In an eighth example, the building controller device of the first example, wherein the established duplex connection between the building controller device and the remote server may use a single Transmission Control Protocol (TCP).

In a ninth example, the building controller device of the first example, wherein the duplex connection between the controller and the remote server may be established using a multi-channel protocol.

In a tenth example, the building controller device of claim 1, wherein: the building controller device may comprise a thermostat that is configured to control one or more HVAC components of an HVAC system, and the environmental sensor may be a temperature sensor.

In an eleventh example, method of operating a building controller device of a building automation system may further comprise: identifying a trigger at the building controller device; initiating a duplex connection between the building controller device and a remote server in response to identifying the trigger at the building controller device.

In a twelfth example, the method of the eleventh example may further comprise: receiving a voice stream via a microphone of the building controller device after identifying the trigger; and sending at least a portion of the voice stream from the building controller device to the remote server over the duplex connection.

In a thirteenth example, the method of the eleventh example, wherein identifying the trigger may include identifying a trigger phrase in a voice stream that is received via a microphone of the building controller device.

In a fourteenth example, the method of the eleventh example may further comprise: receiving an audio message at the building controller device from the remote server.

In a fifteenth example, the method of the fourteenth example may further comprise: sending a voice stream from the building controller device to the remote server over the duplex connection while receiving the audio message from the remote server.

In a sixteenth example, a server configured to communicate with one or more building controller devices of one or more building automation systems may comprise: a communications module for establishing a duplex connection with a building controller device upon a request by the building controller device; a voice interaction module operatively coupled to the communications module, wherein the voice interaction module is configured to provide an interactive audio dialog with a user of the building controller device by identifying one or more words in a voice stream received from the building controller device over the duplex connection, and in response, sending a return voice message to the building controller device over the duplex connection.

In a seventeenth example, the server of the sixteenth example, wherein the return voice message may be sent to the building controller device over the duplex connection while still receiving the voice stream from the building controller device.

In an eighteenth example, the server of the seventeenth example, wherein the voice interaction module may be configured to interrupt the return voice message if the voice interaction module identifies one or more subsequent words in the voice stream that indicate that the return voice message is no longer applicable.

In a nineteenth example, the server of the sixteenth example, wherein in response to identifying one or more words in a voice stream, the voice interaction module may be configured to send a control command to the building controller device to change at least one control parameter of the building controller device.

In a twentieth example, the server of the sixteenth example, wherein the voice interaction module may be configured to terminate the duplex connection between the server and the building controller device in response to the voice interaction module determining that the interactive audio dialogue is over.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A thermostat configured to control one or more HVAC components of an HVAC system, the thermostat comprising:
   a housing, the housing configured to house:
      a temperature sensor;
      a microphone;

a controller operatively coupled to the temperature sensor and the microphone; and wherein the controller is configured to identify an audio trigger received by the microphone, and in response to identifying the audio trigger, establish a full duplex connection between the thermostat and a remote server, wherein the audio trigger is a trigger phrase contained in an audio voice stream.

2. The thermostat of claim 1, wherein the audio trigger is identified by the controller of the thermostat.

3. The thermostat of claim 1, further comprising:
a speaker at least partially housed by the housing; and
wherein the controller is configured to play an audio voice message on the speaker, wherein the audio voice message is received from the remote server via the established full duplex connection.

4. The thermostat of claim 1, wherein the established full duplex connection between the thermostat and the remote server includes a plurality of sub-channels.

5. The thermostat of claim 4, wherein the plurality of sub-channels include a first sub-channel configured to send audio data to the remote server, a second sub-channel configured to receive audio data from the remote server, and a third sub-channel configured to receive one or more controller understandable commands from the remote server.

6. The thermostat of claim 5, wherein the controller of the thermostat is configured to receive audio data from the remote server over the second sub-channel while at the same time send audio data from the controller to the remote server over the first sub-channel.

7. The thermostat of claim 1, wherein the established full duplex connection between the thermostat and the remote server uses a single Transmission Control Protocol (TCP).

8. The thermostat of claim 1, wherein the full duplex connection between the controller and the remote server is established using a multi-channel protocol.

9. A method of operating a thermostat of an HVAC system, the method comprising:
the thermostat identifying an audible trigger phrase provided by a user;
in response to identifying the trigger phrase, the thermostat initiating a full duplex connection between the thermostat and a remote server;
in response to identifying the trigger phrase, the thermostat providing an audible request for a voice command from the user;
in response to the audible request, the thermostat configured to receive a voice stream from the user, the voice stream including a voice command;
the thermostat providing the received voice stream from the user to the remote server via the full duplex connection; and
the remote server processing the voice stream to identify the voice command.

10. The method of claim 9, wherein
the voice stream is received by the thermostat from the user via a microphone of the thermostat after providing the audible request via a speaker of the thermostat.

11. The method of claim 9, wherein identifying the audible trigger phrase includes identifying the trigger phrase in a voice stream that is received via a microphone of the thermostat.

12. The method of claim 9, further comprising:
receiving an audio message at the thermostat from the remote server after the remote server has identified the voice command.

13. The method of claim 12, further comprising:
sending a voice stream from the thermostat to the remote server over the full duplex connection while receiving the audio message from the remote server.

14. A server configured to communicate with one or more thermostats of one or more HVAC systems, the server comprising:
a communications module for establishing a full duplex connection with a thermostat upon a request by the thermostat, wherein the thermostat includes a microphone configured to receive an audio trigger that initiates the request by the thermostat;
a voice interaction module operatively coupled to the communications module, wherein the voice interaction module is configured to provide an interactive audio dialog with a user of the thermostat by identifying one or more words in a voice stream received from the thermostat over a first channel of the full duplex connection, and in response, sending a return voice message to the thermostat over a second channel of the full duplex connection; and
wherein in response to identifying one or more words in a voice stream, the voice interaction module is further configured to determine and then send a control command to the thermostat over a third channel of the full duplex connection to change at least one control parameter of the thermostat.

15. The server of claim 14, wherein the return voice message is sent to the thermostat over the full duplex connection while still receiving the voice stream from the thermostats.

16. The server of claim 15, wherein the voice interaction module is configured to interrupt the return voice message if the voice interaction module identifies one or more subsequent words in the voice stream that indicate that the return voice message is no longer applicable.

17. The server of claim 14, wherein the voice interaction module is configured to terminate the full duplex connection between the server and the thermostat in response to the voice interaction module determining that the interactive audio dialogue is over.

* * * * *